US012090619B2

(12) United States Patent
Nakatsuka et al.

(10) Patent No.: US 12,090,619 B2
(45) Date of Patent: Sep. 17, 2024

(54) SCREWING MACHINE AND METHOD FOR ASSEMBLING SCREWING MACHINE

(71) Applicant: MAKITA CORPORATION, Anjo (JP)

(72) Inventors: Takaharu Nakatsuka, Anjo (JP); Yoshihiro Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 573 days.

(21) Appl. No.: 17/514,691

(22) Filed: Oct. 29, 2021

(65) Prior Publication Data
US 2022/0184792 A1 Jun. 16, 2022

(30) Foreign Application Priority Data
Dec. 11, 2020 (JP) ................................ 2020-205467

(51) Int. Cl.
| *B25F 5/00* | (2006.01) |
| *H02K 5/173* | (2006.01) |
| *H02K 7/08* | (2006.01) |
| *H02K 7/116* | (2006.01) |
| *H02K 7/14* | (2006.01) |
| *H02K 11/24* | (2016.01) |
| *H02K 21/16* | (2006.01) |
| *B25B 23/147* | (2006.01) |

(52) U.S. Cl.
CPC ............ *B25F 5/001* (2013.01); *H02K 5/1732* (2013.01); *H02K 7/083* (2013.01); *H02K 7/116* (2013.01); *H02K 7/145* (2013.01); *H02K 11/24* (2016.01); *H02K 21/16* (2013.01); *B25B 23/147* (2013.01)

(58) Field of Classification Search
CPC ....... B25B 23/147; B25F 5/001; H02K 11/24; H02K 21/16; H02K 5/1732; H02K 7/083; H02K 7/116; H02K 7/145
USPC ....................................... 310/50, 51
See application file for complete search history.

(56) References Cited

U.S. PATENT DOCUMENTS 9,016,398 B2   4/2015  Steckel et al.
2012/0292065 A1 * 11/2012 Hoshi .................... B25B 21/02
                                                              173/93

(Continued)

FOREIGN PATENT DOCUMENTS

EP    2 865 492 A1   4/2015
JP     3005466 U    12/1994

(Continued)

OTHER PUBLICATIONS

Apr. 16, 2024 Office Action issued in Japanese Patent Application No. 2020-205467.

*Primary Examiner* — Rashad H Johnson
(74) *Attorney, Agent, or Firm* — Oliff PLC

(57) ABSTRACT

A torque sensor is less likely to lower detection accuracy. A screwing machine includes a motor including a stator and a rotor rotatable about a rotation axis, a gear case, a planetary gear, an internal gear connected to the planetary gear, a torque sensor including a front plate coupled to the internal gear, a rear plate supported by the gear case, a hollow portion located between the front plate and the rear plate, and a strain gauge fixed to the hollow portion, a bearing located between the stator and the rear plate and supporting at least a part of the rotor, and a bearing box surrounding the bearing and supporting the bearing.

20 Claims, 16 Drawing Sheets

(56) References Cited

U.S. PATENT DOCUMENTS

| | | | |
|---|---|---|---|
| 2017/0313379 A1* | 11/2017 | Gao | B62M 11/145 |
| 2019/0283222 A1* | 9/2019 | Thorson | B25B 23/141 |
| 2020/0063793 A1* | 2/2020 | Rossberger | B62M 6/50 |
| 2022/0184792 A1* | 6/2022 | Nakatsuka | H02K 5/1732 |
| 2022/0190687 A1* | 6/2022 | Fukuoka | B25B 23/147 |
| 2024/0189970 A1* | 6/2024 | Hirabayashi | B25B 21/02 |

FOREIGN PATENT DOCUMENTS

| | | |
|---|---|---|
| JP | H09-029654 A | 2/1997 |
| JP | 5094952 B2 | 12/2012 |
| JP | 2016-099163 A | 5/2016 |
| JP | 2017-173183 A | 9/2017 |
| JP | 6452399 B2 | 1/2019 |
| JP | 6472221 B2 | 2/2019 |

* cited by examiner

SCREWING MACHINE AND METHOD FOR ASSEMBLING SCREWING MACHINE

CROSS-REFERENCE TO RELATED APPLICATIONS

This application claims the benefit of priority to Japanese Patent Application No. 2020-205467, filed on Dec. 11, 2020, the entire contents of which are hereby incorporated by reference.

BACKGROUND

1. Technical Field

The present disclosure relates to a screwing machine and a method for assembling a screwing machine.

2. Description of the Background

A product assembly process includes a screwing operation using a screwing machine. Product management may include recording of detection signals of torque applied to an output unit of a screwing machine. Japanese Unexamined Patent Application Publication No. 2016-099163 describes a torque sensor that includes a motor as a driving source and detects torque for driving a driven unit.

BRIEF SUMMARY

The torque sensor may reduce detection accuracy when receiving vibrations of the motor, or when failing to receive appropriate torsion.

One or more aspects of the present disclosure are directed to a torque sensor less likely to lower detection accuracy.

A first aspect of the present disclosure provides a screwing machine, including:
- a motor including a stator and a rotor, the rotor being rotatable about a rotation axis extending in a front-rear direction;
- a gear case located frontward from the stator;
- a planetary gear accommodated in the gear case and rotatable by the rotor;
- an internal gear accommodated in the gear case, connected to the planetary gear, and rotatable relative to the gear case;
- a torque sensor accommodated in the gear case, the torque sensor including
  - a front plate coupled to the internal gear,
  - a rear plate located rearward from the front plate and supported by the gear case,
  - a hollow portion located between the front plate and the rear plate in the front-rear direction, and
  - a strain gauge fixed to the hollow portion;
- a bearing located between the stator and the rear plate in the front-rear direction, and supporting at least a part of the rotor; and
- a bearing box surrounding the bearing and supporting the bearing.

A second aspect of the present disclosure provides a screwing machine, including:
- a motor including a stator and a rotor, the rotor being rotatable about a rotation axis extending in a front-rear direction;
- a gear case located frontward from the stator;
- a planetary gear accommodated in the gear case and rotatable by the rotor;
- an internal gear accommodated in the gear case, connected to the planetary gear, and rotatable relative to the gear case;
- a torque sensor accommodated in the gear case, the torque sensor including
  - a front plate coupled to the internal gear,
  - a rear plate located rearward from the front plate and supported by the gear case,
  - a hollow portion located between the front plate and the rear plate in the front-rear direction, and
  - a strain gauge fixed to the hollow portion; and
- a fastener configured to restrict relative rotation between the rear plate and the gear case, the fastener being located inward from an outer circumferential surface of the rear plate in a radial direction of the rotation axis, the fastener being in contact with a first portion of the rear plate and a second portion of the gear case.

A third aspect of the present disclosure provides a method for assembling a screwing machine, the method including:
- inserting a torque sensor into a gear case accommodating a planetary gear and an internal gear connected to the planetary gear, the torque sensor including a front plate including gear teeth, a rear plate located rearward from the front plate, a hollow portion located between the front plate and the rear plate in a front-rear direction, and a strain gauge fixed to the hollow portion;
- meshing the internal gear with the gear teeth;
- circumferentially aligning, after meshing the internal gear with the gear, the rear plate with the gear case by rotating the rear plate relative to the gear case; and
- fastening, after aligning the rear plate with the gear case, the rear plate to the gear case.

The structure and the method according to the above aspects of the present disclosure achieve the torque sensor less likely to lower detection accuracy.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of a screwing machine 1.

The screwing machine 1 is a power tool powered by a motor 5. A direction parallel to a rotation axis AX of the motor 5 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. The axial direction corresponds to the front-rear direction. The axial direction is from the front to the rear or from the rear to the front. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

Screwing Machine

Figure 1:
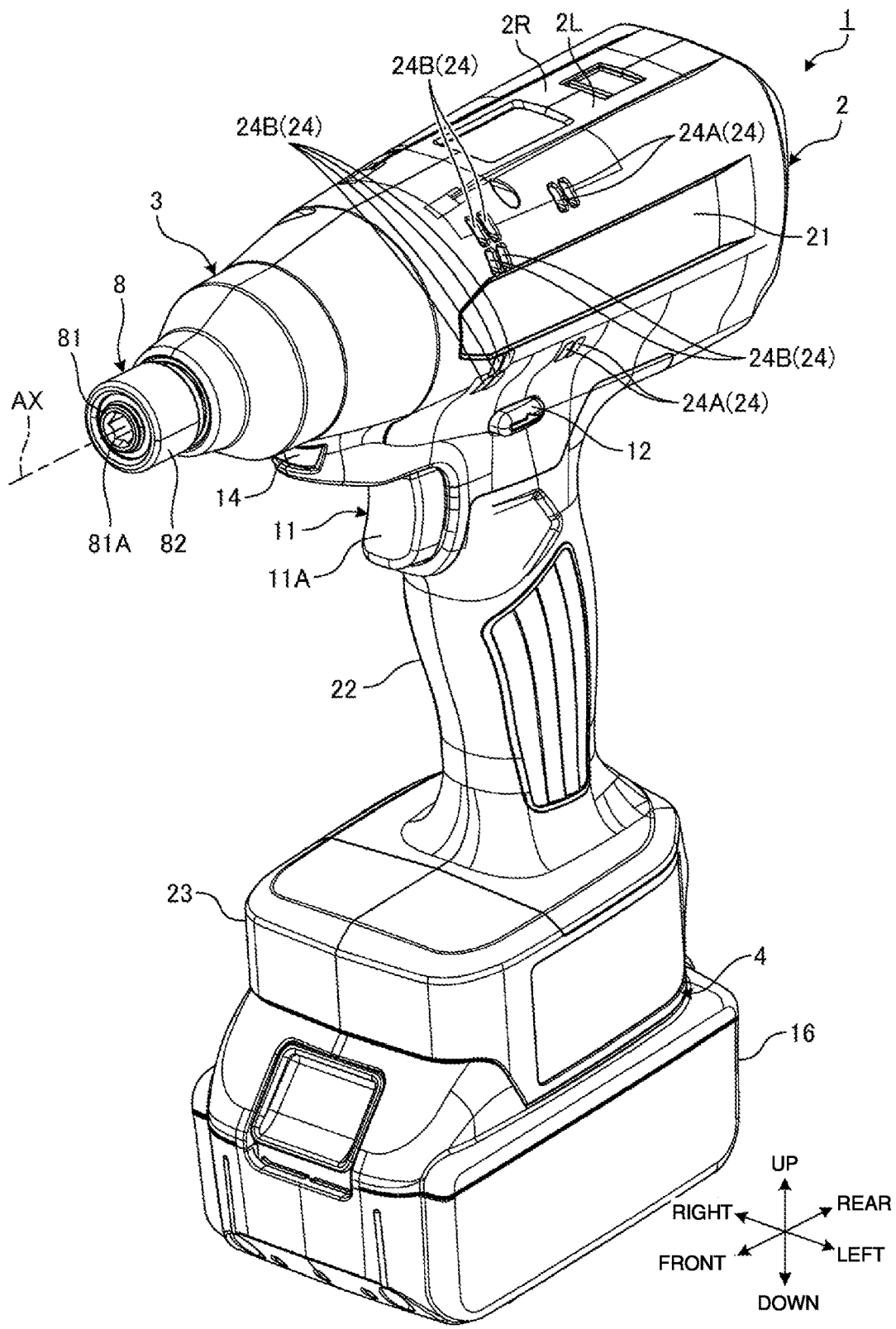
FIG. 1 is a perspective view of a screwing machine according to an embodiment as viewed from the left front.
Figure 2:
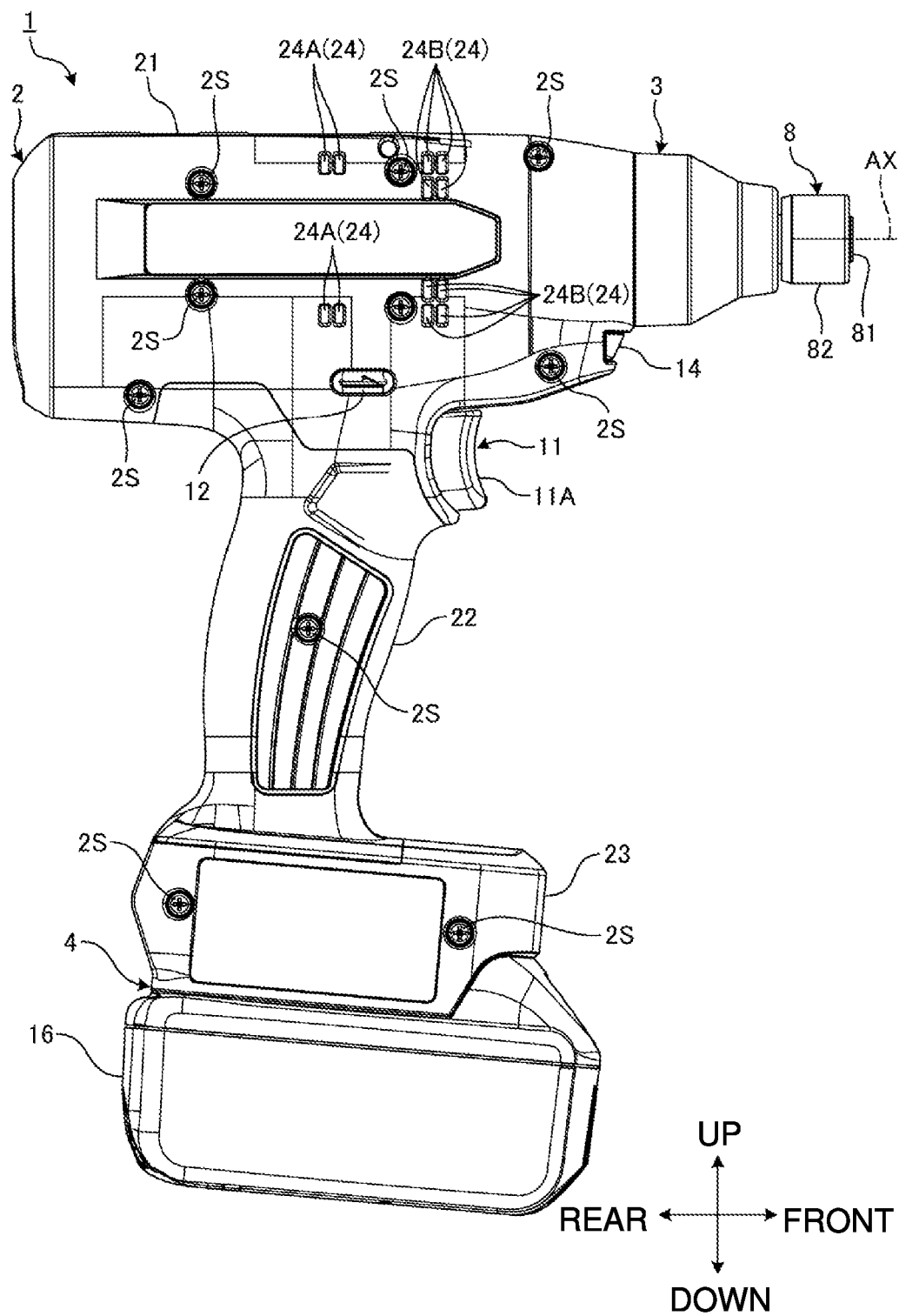
FIG. 2 is a side view of the screwing machine according to the embodiment.
Figure 3:
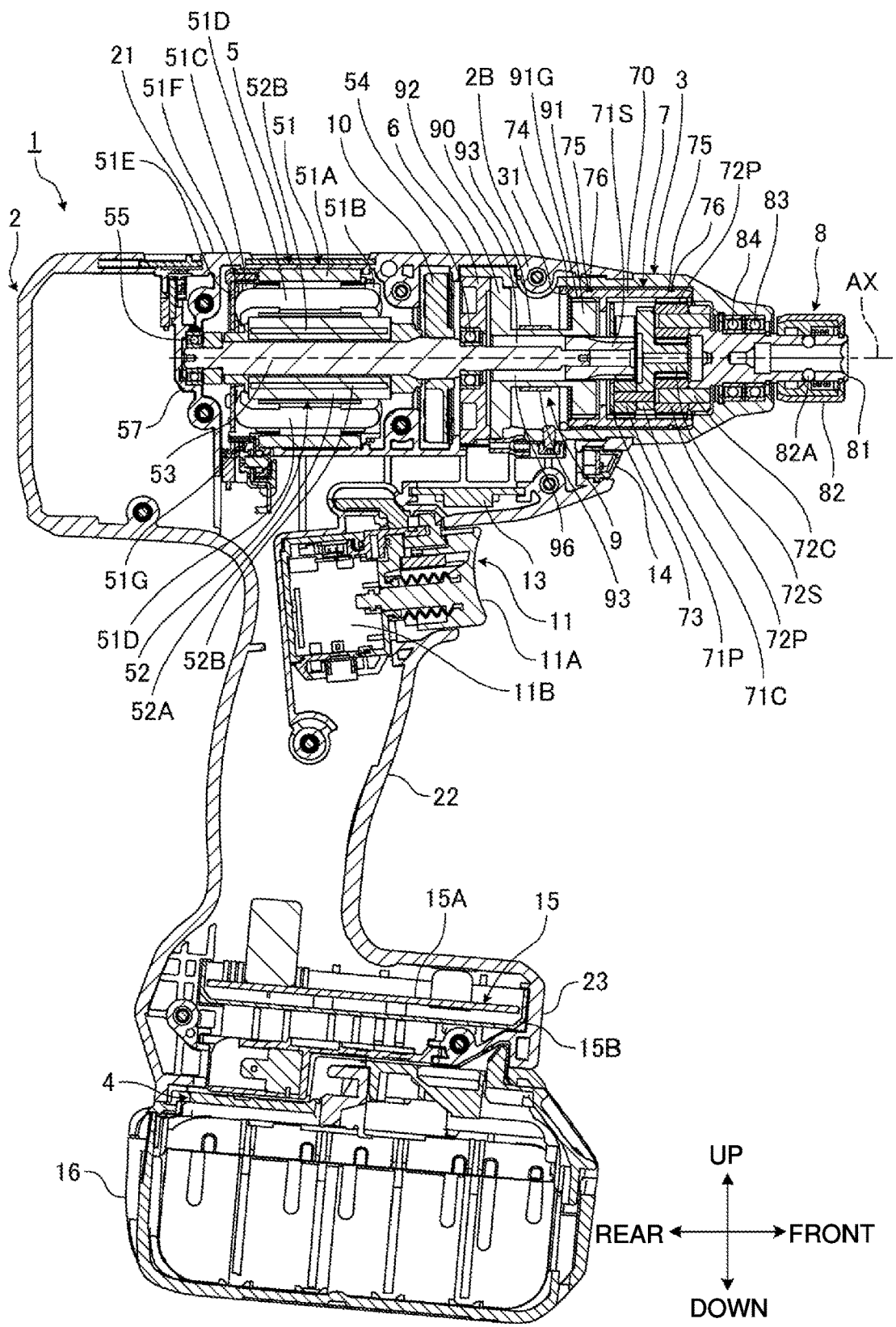
FIG. 3 is a cross-sectional view of the screwing machine according to the embodiment.

FIG. 1 is a perspective view of the screwing machine 1 according to an embodiment as viewed from the left front. FIG. 2 is a side view of the screwing machine 1 according to the embodiment. FIG. 3 is a cross-sectional view of the screwing machine 1 according to the embodiment.

The screwing machine 1 is an electric driver for industrial use that is used in product assembly plants. The screwing machine 1 is used to perform a screwing operation in a product assembly process. Examples of the assembly plants include an automobile assembly plant. Examples of the products include an automobile.

As shown in FIGS. 1 to 3, the screwing machine 1 includes a housing 2, a gear case 3, a battery mount 4, the motor 5, a bearing 54 and a bearing 55, a bearing box 6, a planetary gear assembly 7, an output unit 8, a torque sensor 9, a fan 10, a trigger switch 11, a forward-reverse switch lever 12, a sound output unit 13, a light emitter 14, and a controller 15.

The housing 2 is formed from a synthetic resin. The housing 2 includes a left housing 2L and a right housing 2R. The left and right housings 2L and 2R are fastened together with screws 2S to form the housing 2.

The housing 2 includes a motor compartment 21, a grip 22, and a controller compartment 23.

The motor compartment 21 accommodates the motor 5. The motor compartment 21 includes a cylindrical portion. The motor compartment 21 is located above the grip 22. The motor compartment 21 includes screw bosses 2B, each having an opening for receiving a corresponding screw 2S.

The grip 22 is grippable by an operator's hand. The grip 22 is located below the motor compartment 21. The grip 22 protrudes downward from the motor compartment 21. The trigger switch 11 is located on the grip 22.

The controller compartment 23 accommodates the controller 15. The controller compartment 23 is located below the grip 22. The controller compartment 23 is connected to a lower end of the grip 22. The controller compartment 23 has larger outer dimensions than the grip 22 in the front-rear and lateral directions.

The gear case 3 accommodates the bearing box 6, the torque sensor 9, the planetary gear assembly 7, and part of the output unit 8. The gear case 3 is located frontward from at least a part of the motor 5. The gear case 3 is cylindrical. The gear case 3 is formed from a metal. The gear case 3 in the embodiment is formed from aluminum. The gear case 3 covers a front opening of the motor compartment 21. The gear case 3 is fastened to the motor compartment 21. The gear case 3 has a rear portion in the motor compartment 21. The motor compartment 21 at least partially surrounds the gear case 3. The gear case 3 has a front portion located frontward from the motor compartment 21.

The battery mount 4 is located below the controller compartment 23. The battery mount 4 is connected to a battery pack 16. The battery pack 16 is attached to the battery mount 4 in a detachable manner. The battery pack 16 may be a secondary battery. The battery pack 16 in the embodiment is a rechargeable lithium-ion battery. The battery pack 16 is attached to the battery mount 4 to power the screwing machine 1. The motor 5 is driven by power supplied from the battery pack 16. The controller 15 operates on power supplied from the battery pack 16.

The motor 5 is a power source for the screwing machine 1. The motor 5 is an electric motor. The motor 5 is a brushless inner-rotor motor. The motor 5 is accommodated in the motor compartment 21.

Figure 4:
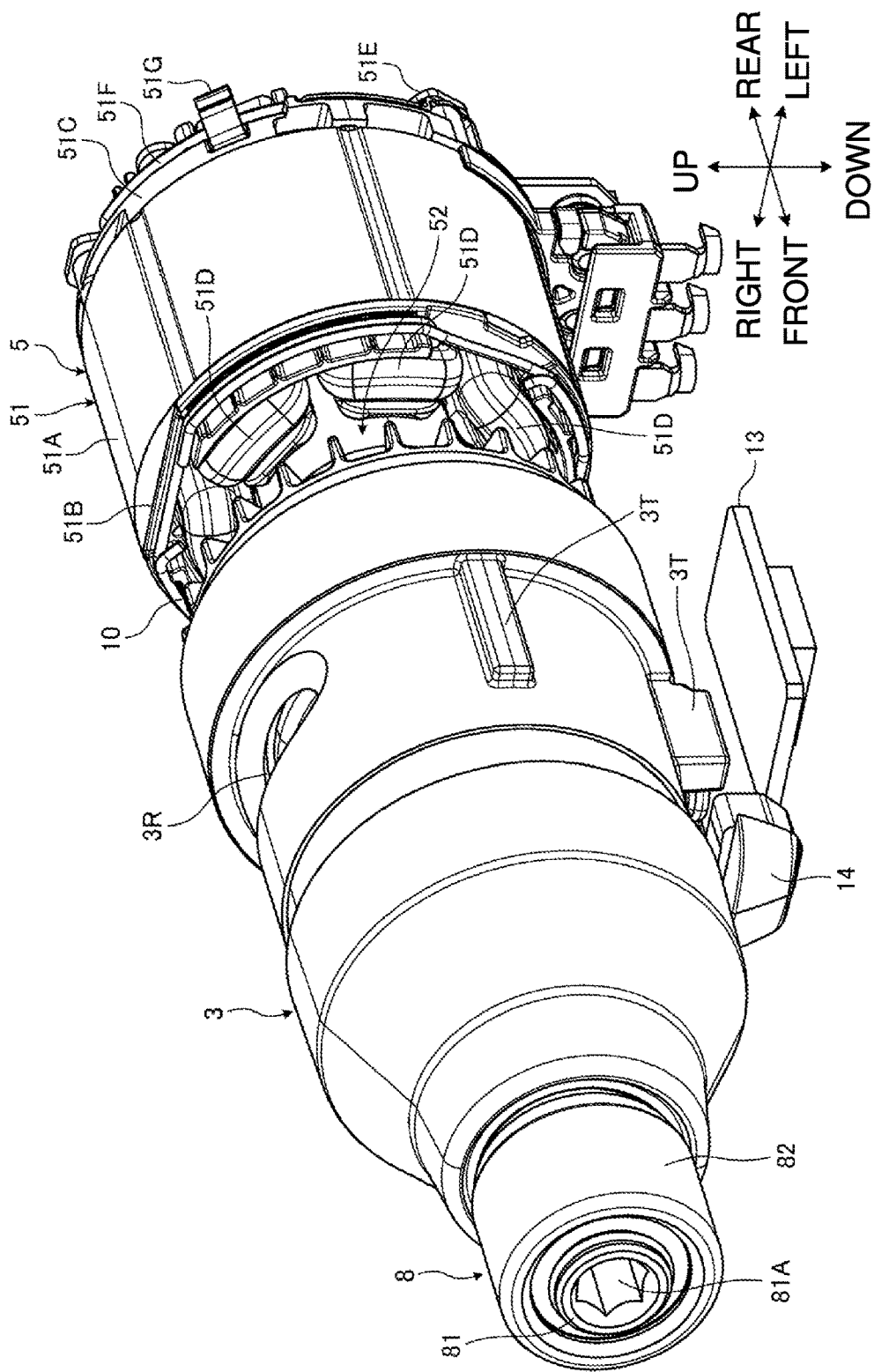
FIG. 4 is a perspective view of an inside of a motor compartment in the embodiment as viewed from the left front.
Figure 5:
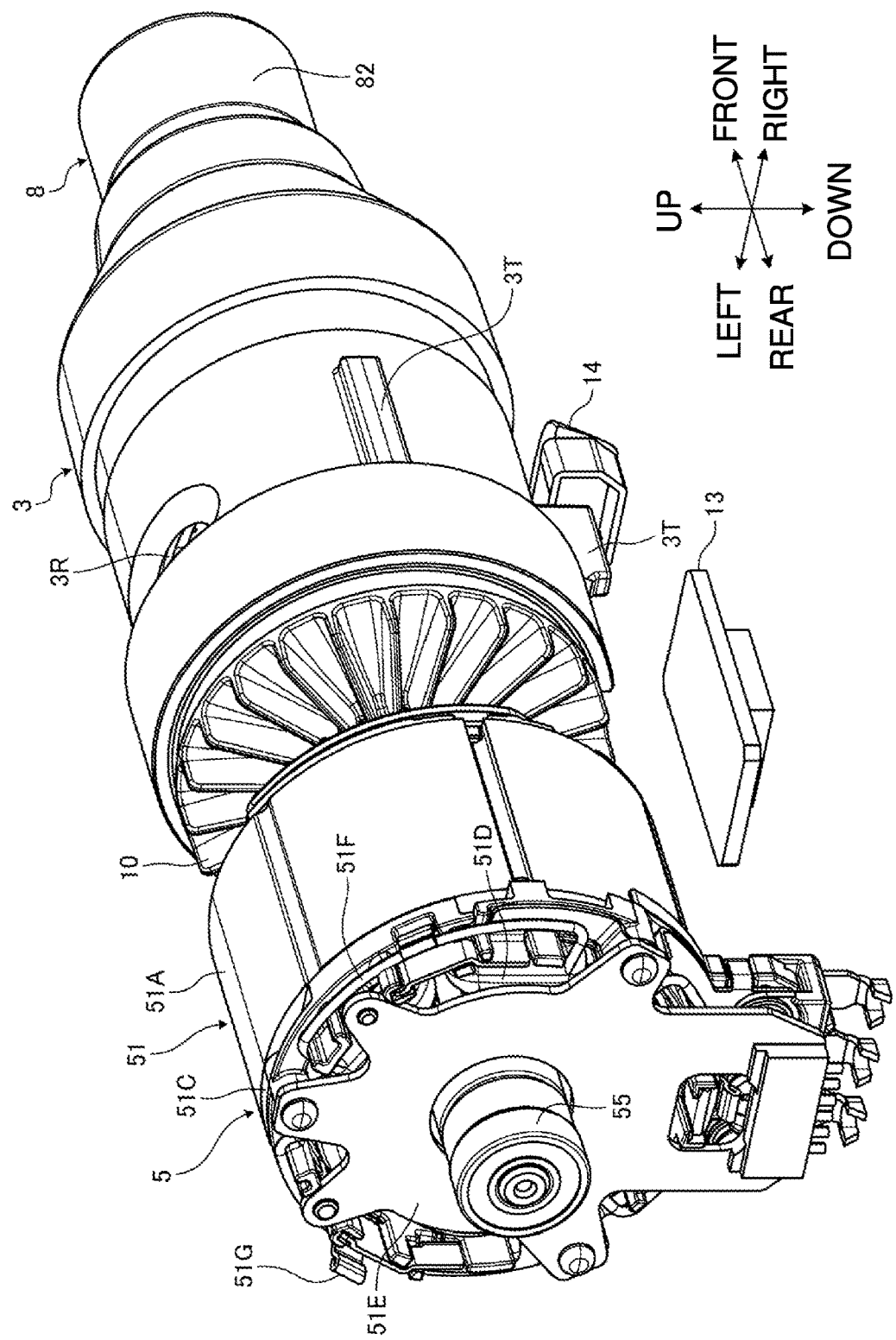
FIG. 5 is a perspective view of the inside of the motor compartment in the embodiment as viewed from the right rear.

FIG. 4 is a perspective view of an inside of the motor compartment 21 in the embodiment as viewed from the left front. FIG. 5 is a perspective view of the inside of the motor compartment 21 in the embodiment as viewed from the right rear.

As shown in FIGS. 1 to 5, the motor 5 includes a stator 51 and a rotor 52. The stator 51 surrounds the rotor 52. The rotor 52 rotates about the rotation axis AX. The gear case 3 is located frontward from the stator 51. The gear case 3 has a recess 3R on its top. The recess 3R receives a screw boss 2B. The gear case 3 has protrusions 3T on its right, left, and lower surfaces. The protrusions 3T are engaged with at least a part of the motor compartment 21. The protrusions 3T thus restrict rotation of the gear case 3 relative to the motor compartment 21.

The stator 51 includes a stator core 51A, a front insulator 51B, a rear insulator 51C, coils 51D, a sensor board 51E, a short-circuiting member 51F, and a fuse terminal 51G.

The stator core 51A is cylindrical. The stator core 51A includes multiple steel plates stacked on one another. The front insulator 51B is fixed to the front of the stator core 51A. The rear insulator 51C is fixed to the rear of the stator core 51A. The stator 51 includes multiple coils 51D. The coils 51D are wound around the teeth on the stator core 51A with the front insulator 51B and the rear insulator 51C between them. The sensor board 51E includes multiple detectors to detect rotation of the rotor 52. The sensor board 51E is supported by the rear insulator 51C. The short-circuiting member 51F connects the coils 51D through the fuse terminal 51G. The short-circuiting member 51F is supported by the rear insulator 51C. The short-circuiting member 51F is connected to the controller 15 with lead wires (not shown).

The rotor 52 includes a rotor core 52A, permanent magnets 52B, and a rotor shaft 53.

The rotor core 52A is inside the stator core 51A and the coils 51D. The rotor core 52A is cylindrical. The rotor core 52A surrounds the rotor shaft 53. The rotor core 52A includes multiple steel plates stacked on one another. The rotor 52 includes multiple permanent magnets 52B. The permanent magnets 52B are held by the rotor core 52A. The rotor core 52A has a through-hole extending in the front-rear direction. The rotor core 52A has multiple through-holes aligned circumferentially. The through-holes in the rotor core 52A each receive a corresponding permanent magnet 52B.

The detectors in the sensor board 51E detect the magnetic field of the permanent magnets 52B to detect rotation of the rotor 52. The controller 15 provides a drive current to the coils 51D in response to the detection signals from the detectors.

The rotor shaft 53 extends in the front-rear direction. The rotor shaft 53 rotates about the rotation axis AX. The rotation axis of the rotor shaft 53 is aligned with the rotation axis of the output unit 8.

The bearing 54 supports at least a part of the rotor 52. The bearing 54 supports a front portion of the rotor shaft 53 in a rotatable manner. The bearing 54 supports a portion of the rotor shaft 53 frontward from the stator 51.

The bearing 55 supports at least a part of the rotor 52. The bearing 55 supports a rear portion of the rotor shaft 53 in a rotatable manner. The bearing 55 supports a portion of the rotor shaft 53 rearward from the stator 51.

The bearing box 6 surrounds the bearing 54. The bearing box 6 supports the bearing 54. The bearing box 6 is accommodated in the gear case 3. The bearing box 6 is fastened to the gear case 3.

The bearing 55 is held in a bearing holder 57 in the motor compartment 21.

The rotor shaft 53 has its front end located frontward from the bearing 54. The rotor shaft 53 has its front end located inside the gear case 3.

The rotor shaft 53 receives, on its front end, a pinion gear 71S in a detachable manner. The pinion gear 71S is replaceable. The pinion gear 71S is cylindrical. The pinion gear 71S is mounted on the rotor shaft 53 through the front end of the rotor shaft 53 from the front. The pinion gear 71S mounted on the front end of the rotor shaft 53 is detachable from the rotor shaft 53 when being pulled forward from the rotor shaft 53. The rotor shaft 53 is connected to the planetary gear assembly 7 via the pinion gear 71S.

The planetary gear assembly 7 is accommodated in the gear case 3. The planetary gear assembly 7 is located frontward from the torque sensor 9. The planetary gear assembly 7 connects the rotor shaft 53 and the output unit 8 together. The planetary gear assembly 7 reduces rotation of the rotor shaft 53 and rotates the output unit 8 at a lower rotational speed than the rotor shaft 53. The planetary gear assembly 7 serves as a power transmission assembly that transmits rotational power generated by the motor 5 to the output unit 8.

Figure 6:
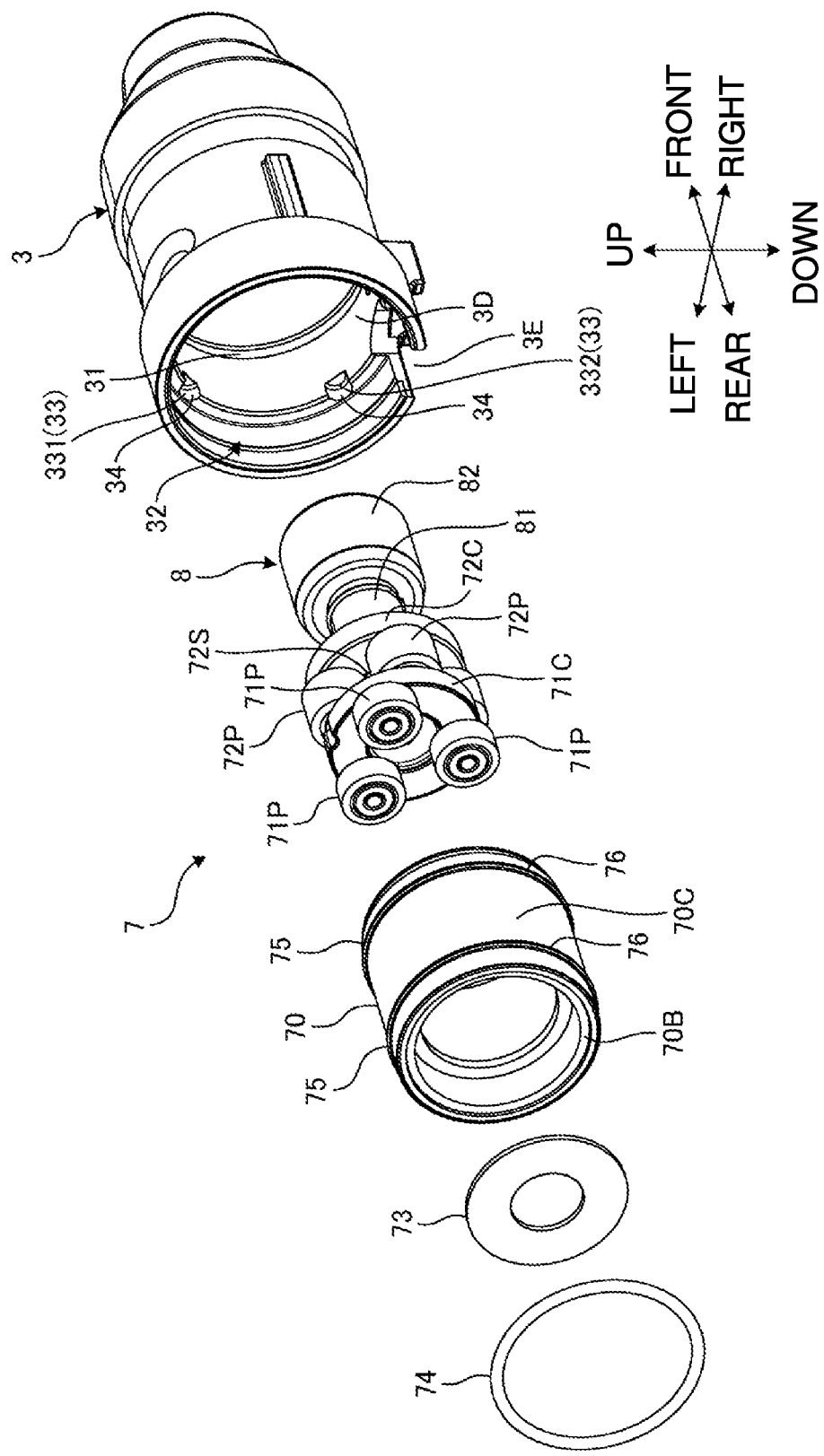
FIG. 6 is an exploded perspective view of a gear case and a planetary gear assembly in the embodiment.

FIG. 6 is an exploded perspective view of the gear case 3 and the planetary gear assembly 7 in the embodiment.

As shown in FIGS. 3 and 6, the planetary gear assembly 7 includes planetary gears 71P, a carrier 71C, a sun gear 72S, planetary gears 72P, a carrier 72C, and an internal gear 70, all of which are accommodated in the gear case 3.

The planetary gear assembly 7 includes multiple planetary gears 71P. The planetary gears 71P (three in the embodiment) surround the pinion gear 71S. Each planetary gear 71P meshes with the pinion gear 71S.

The carrier 71C supports the planetary gears 71P in a rotatable manner.

The sun gear 72S is located in front of the carrier 71C. The sun gear 72S has a smaller diameter than the carrier 71C. The sun gear 72S is integral with the carrier 71C. The sun gear 72S and the carrier 71C rotate together.

The planetary gear assembly 7 includes multiple planetary gears 72P. The planetary gears 72P (four in the embodiment) surround the sun gear 72S. Each planetary gear 72P meshes with the sun gear 72S. The planetary gears 72P are located between the sun gear 72S and the internal gear 70 in the radial direction.

The carrier 72C supports the planetary gears 72P in a rotatable manner. The carrier 72C is connected to the output unit 8. The carrier 72C is rotatable about the rotation axis AX.

The internal gear 70 is substantially cylindrical. The internal gear 70 surrounds the planetary gears 72P. The internal gear 70 meshes with each planetary gear 72P. The internal gear 70 has an outer circumferential surface 70C that faces an inner circumferential surface 3D of the gear case 3. The internal gear 70 in the embodiment is rotatable relative to the gear case 3. The internal gear 70 is connected to the torque sensor 9.

A washer 73 is located behind the planetary gears 71P inside the internal gear 70. The washer 73 surrounds the pinion gear 71S.

An elastic member 74 (first elastic member) is located inside the gear case 3. The elastic member 74 is annular. The elastic member 74 is received in a groove 31 on the inner circumferential surface 3D of the gear case 3. The gear case 3 and the elastic member 74 are thus positioned relative to each other. The internal gear 70 has a rear end face 70B in contact with the elastic member 74. The elastic member 74 is, for example, a rubber O-ring.

Elastic members 75 (second elastic members) are located between the gear case 3 and the internal gear 70 in the radial direction. The elastic members 75 are annular. Each elastic member 75 is received in a corresponding groove 76 on the outer circumferential surface 70C of the internal gear 70. The internal gear 70 and the elastic members 75 are thus positioned relative to each other. The inner circumferential surface 3D of the gear case 3 is in contact with the elastic members 75. The elastic members 75 are, for example, rubber O-rings. In the embodiment, two elastic members 75 are arranged in the front-rear direction.

The pinion gear 71S mounted on the front end of the rotor shaft 53 is connected to the planetary gears 72P via the planetary gears 71P, the carrier 71C, and the sun gear 72S. The planetary gears 72P and the carrier 72C are rotated by the rotor 52. The planetary gears 71P are connected to the internal gear 70 via the carrier 71C, the sun gear 72S, and the planetary gears 72P.

When the rotor shaft 53 rotates as driven by the motor 5, the pinion gear 71S rotates, and the planetary gears 71P revolve about the pinion gear 71S. The carrier 71C and the sun gear 72S then rotate at a lower rotational speed than the rotor shaft 53. As the sun gear 72S rotates, the planetary gears 72P revolve about the sun gear 72S. The carrier 72C then rotates at a lower rotational speed than the carrier 71C. As described above, as the motor 5 is driven, the carrier 72C rotates at a lower rotational speed than the rotor shaft 53.

The output unit 8 is driven by the rotor 52. The output unit 8 rotates by rotational power transmitted from the rotor 52 through the planetary gear assembly 7. The output unit 8 rotates about the rotation axis AX. The output unit 8 is located frontward from the stator 51. The output unit 8 is located at least partially frontward from the planetary gear assembly 7. The output unit 8 receives a bit (tip tool). The output unit 8 rotates with the bit attached to it.

The output unit 8 includes a spindle 81 and a chuck 82.

The spindle 81 rotates about the rotation axis AX by rotational power transmitted from the rotor 52. The spindle 81 is supported by bearings 83 and 84 in a rotatable manner. The spindle 81 is connected to the carrier 72C. As the carrier 72C rotates, the spindle 81 rotates about the rotation axis AX.

The spindle 81 has an insertion hole 81A to receive the bit. The insertion hole 81A extends rearward from the front end of the spindle 81. The insertion hole 81A has a hexagonal cross section in a direction orthogonal to the rotation axis AX. The bit also has a hexagonal cross section. The bit is placed in the insertion hole 81A, and thus fitted to the spindle 81 immovable in the circumferential direction.

The chuck 82 surrounds a front portion of the spindle 81. The chuck 82 restricts the bit from slipping off the insertion hole 81A. The bit has recesses on its side surface. The chuck 82 includes balls 82A received in the recesses on the bit. The balls 82A on the chuck 82 are received in the recesses on the bit with the bit placed through the insertion hole 81A. This restricts the bit from slipping off the insertion hole 81A. As the spindle 81 rotates, the bit in the insertion hole 81A rotates.

The torque sensor 9 detects any abnormality in an operation performed by the output unit 8. The torque sensor 9 is connected to the output unit 8. The operation performed by the output unit 8 in the embodiment includes a screwing operation. The torque sensor 9 in the embodiment detects torque applied to the output unit 8 during a screwing operation. A detection signal output from the torque sensor 9 represents torque applied to the output unit 8. The screwing operation is performed with the bit attached to the output unit 8. The torque detected by the torque sensor 9 includes torque for tightening the screw applied to the output unit 8 during the screwing operation.

The torque sensor 9 is accommodated in the gear case 3. The torque sensor 9 is located between the stator 51 and the output unit 8 in the front-rear direction. The torque sensor 9 in the embodiment is located between the fan 10 and the planetary gear assembly 7.

The torque sensor 9 is cylindrical. The torque sensor 9 surrounds the rotor shaft 53. The rotor shaft 53 has its front end located frontward from the front end of the torque sensor 9. The pinion gear 71S has its front end located frontward from the front end of the torque sensor 9. The fan 10 and motor 5 are located rearward from the rear end of the torque sensor 9.

The fan 10 generates an airflow for cooling the motor 5. The fan 10 is located between the stator 51 and the bearing box 6 in the front-rear direction. The fan 10 is fixed to the rotor shaft 53. The fan 10 rotates as the rotor shaft 53 rotates.

The motor compartment 21 has openings 24 that connect the inside and the outside of the motor compartment 21. The openings 24 include inlets 24A and outlets 24B. The inlets 24A are located rearward from the outlets 24B. As the fan 10 rotates, air outside the housing 2 flows into the internal space of the housing 2 through the inlets 24A. Air flowing into the internal space of the housing 2 flows through the housing 2 and cools the motor 5. The air passing through the housing 2 flows out of the housing 2 through the outlets 24B.

The trigger switch 11 activates the motor 5. The trigger switch 11 is located on the grip 22. The trigger switch 11 includes a trigger 11A and a switch body 11B. The switch body 11B is accommodated in the grip 22. The trigger 11A protrudes frontward from the upper front of the grip 22. The trigger 11A is operable by the operator. The trigger 11A is operable to switch the motor 5 between the driving state and the stopped state.

The forward-reverse switch lever 12 is operable to change the rotation direction of the rotor 52. The forward-reverse switch lever 12 is located above the grip 22. The forward-reverse switch lever 12 is operable by the operator to switch the rotation direction of the rotor 52 between forward and reverse. This switches the rotation direction of the output unit 8.

The sound output unit 13 produces a sound in response to a detection signal from the torque sensor 9. The sound output unit 13 is accommodated in the motor compartment 21. The light emitter 14 illuminates the output unit 8 or ahead of the output unit 8. The light emitter 14 is located in a front portion of the motor compartment 21. The light emitter 14 emits illumination light. The light emitter 14 includes, for example, a light-emitting diode (LED).

The controller 15 includes a computer system. The controller 15 outputs control commands for controlling the motor 5. The controller 15 is accommodated in the controller compartment 23. The controller 15 includes a board 15A on which multiple electronic components are mounted. The controller 15 is at least partially accommodated in a controller case 15B. Examples of the electronic components mounted on the board 15A include a processor such as a central processing unit (CPU), a nonvolatile memory such as a read-only memory (ROM) or a storage device, a volatile memory such as a random-access memory (RAM), a transistor, a capacitor, and a resistor.

Torque Sensor

Figure 7:
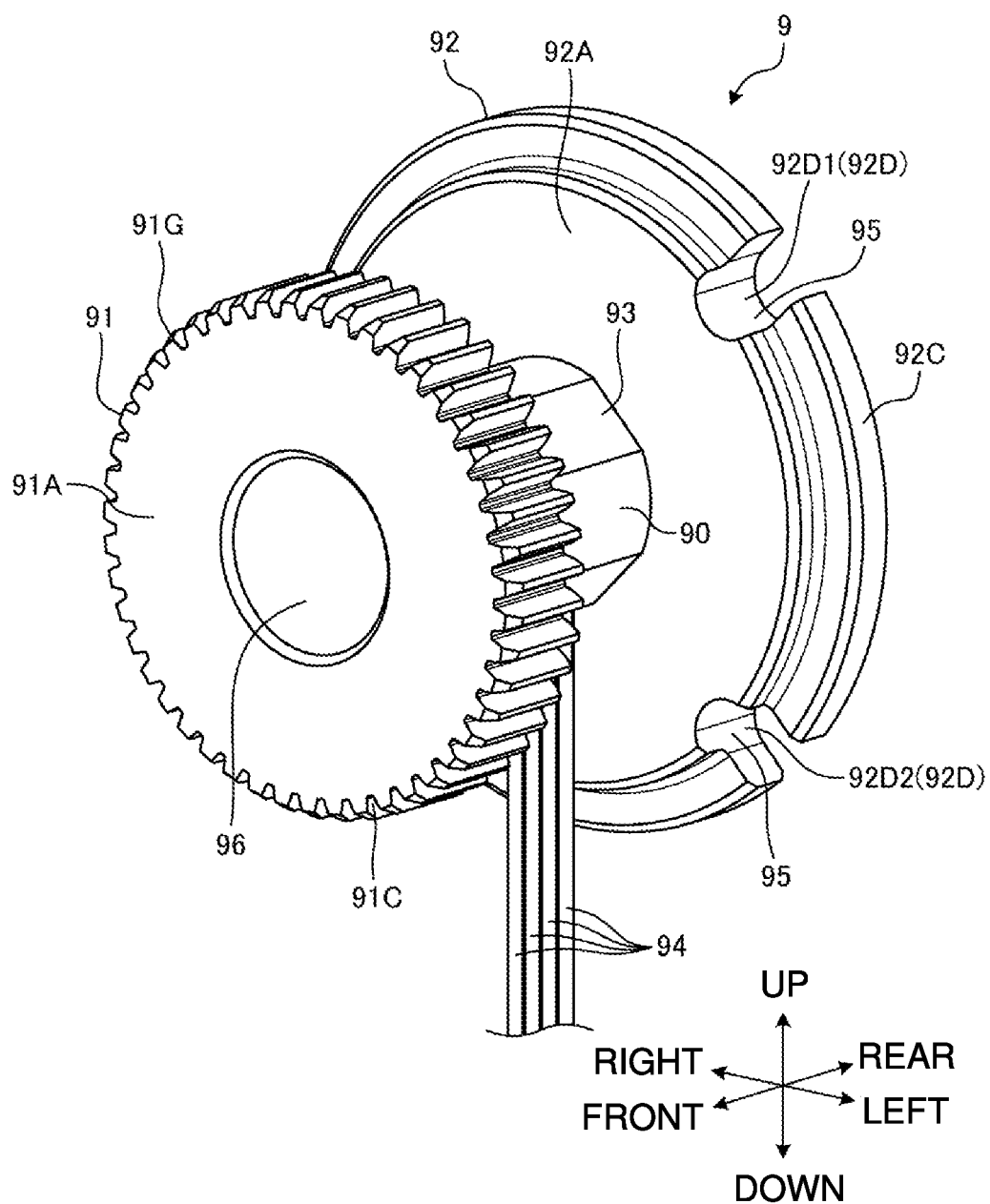
FIG. 7 is a perspective view of a torque sensor in the embodiment as viewed from the left front.
Figure 8:
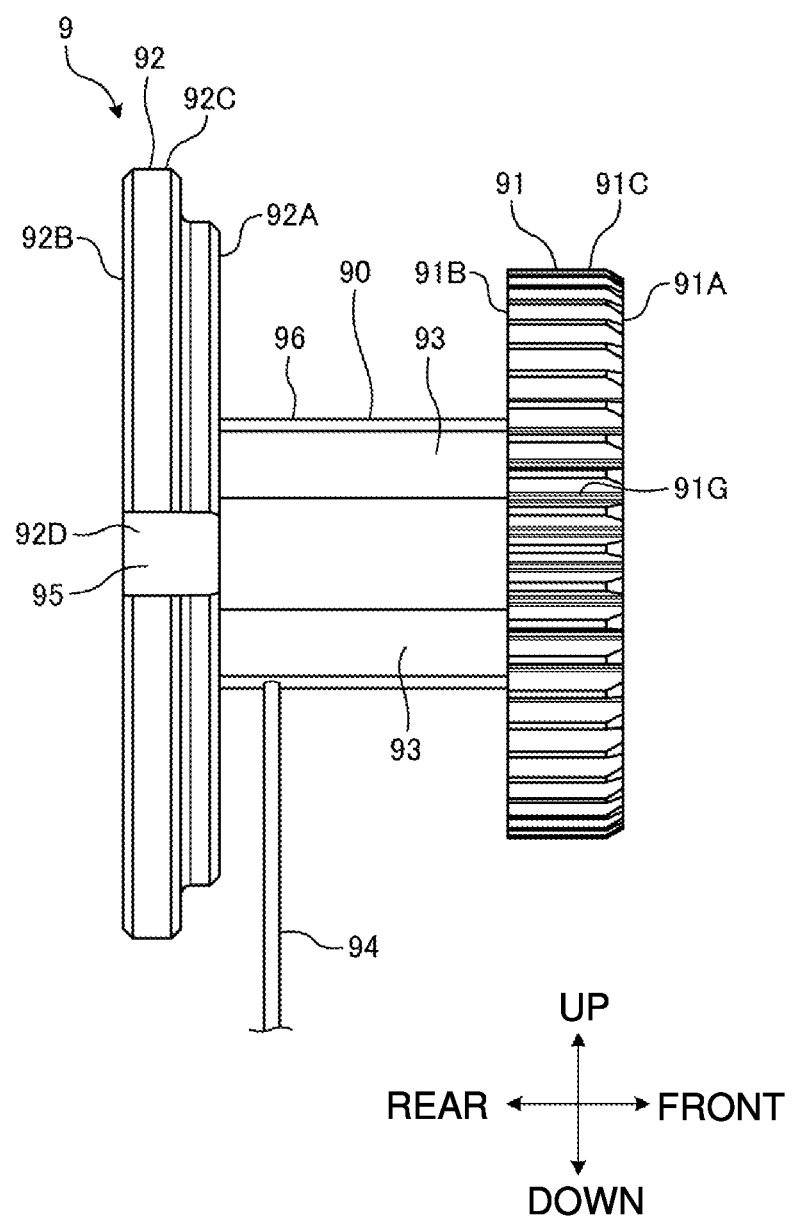
FIG. 8 is a side view of the torque sensor in the embodiment.
Figure 9:
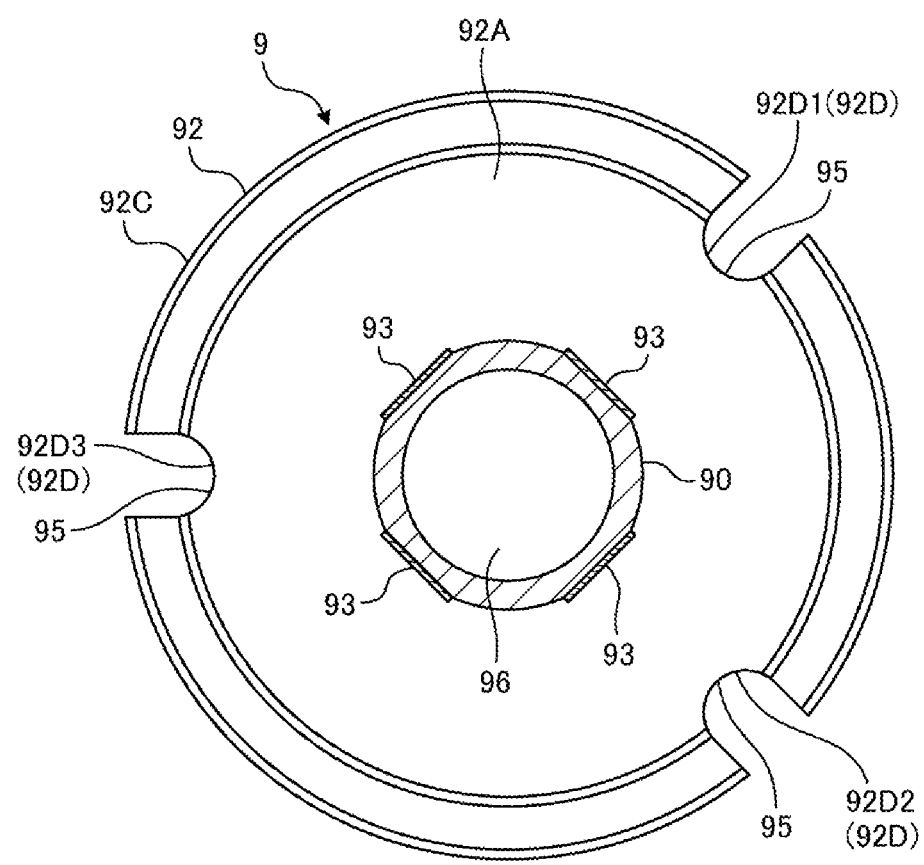
FIG. 9 is a cross-sectional view of the torque sensor in the embodiment.
Figure 9:
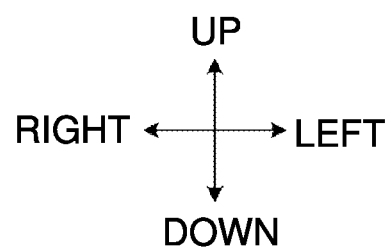

FIG. 7 is a perspective view of the torque sensor 9 in the embodiment as viewed from the left front. FIG. 8 is a side view of the torque sensor 9 in the embodiment. FIG. 9 is a cross-sectional view of the torque sensor 9 in the embodiment.

As shown in FIGS. 3 and 7 to 9, the torque sensor 9 includes a hollow portion 90, a front plate 91, a rear plate 92, strain gauges 93, and lead wires 94.

The hollow portion 90 is cylindrical. The hollow portion 90 is located between the front plate 91 and the rear plate 92 in the front-rear direction. The center axis of the hollow portion 90 is aligned with the rotation axis AX. The hollow portion 90 surrounds the rotor shaft 53.

The front plate 91 is fixed to the front end of the hollow portion 90. The front plate 91 is integral with the hollow portion 90. The front plate 91 is substantially annular. The center axis of the front plate 91 is aligned with the rotation axis AX. The front plate 91 surrounds the rotor shaft 53. The pinion gear 71S mounted on the rotor shaft 53 is at least partially located frontward from the front end of the front plate 91. The front plate 91 has a larger outer diameter than the hollow portion 90.

The front plate 91 has a front surface 91A, a rear surface 91B, and an outer circumferential surface 91C. The front surface 91A faces frontward. The rear surface 91B faces rearward. The front surface 91A and the rear surface 91B are orthogonal to the axis parallel to the rotation axis AX. The outer circumferential surface 91C includes gear teeth 91G.

The front plate 91 is coupled to the internal gear 70. The internal gear 70 at least partially surrounds the front plate 91. The front plate 91 is coupled to the internal gear 70 with the gear teeth 91G on the front plate 91 meshing with the internal gear 70. The torque sensor 9 is connected to the internal gear 70 via the front plate 91. The carrier 72C is connected to the output unit 8. The torque sensor 9 is connected to the output unit 8 with the planetary gear assembly 7 between them.

The rear plate 92 is located rearward from the front plate 91. The rear plate 92 is connected to the rear end of the hollow portion 90. The rear plate 92 is integral with the hollow portion 90. The rear plate 92 is substantially annular. The center axis of the rear plate 92 is aligned with the rotation axis AX. The rear plate 92 surrounds the rotor shaft 53. The rear plate 92 has a larger outer diameter than the hollow portion 90 and the front plate 91.

The rear plate 92 includes a front surface 92A, a rear surface 92B, and an outer circumferential surface 92C. The front surface 92A faces frontward. The rear surface 92B faces rearward. The front surface 92A and the rear surface 92B are orthogonal to the axis parallel to the rotation axis AX. The outer circumferential surface 92C of the rear plate 92 has multiple recesses 92D (first recesses). The recesses 92D are recessed radially inward from the outer circumferential surface 92C. The recesses (three in the embodiment) 92D are located in the rear plate 92 at intervals in the circumferential direction.

The rear plate 92 is supported by the gear case 3. The gear case 3 at least partially surrounds the rear plate 92. The rear plate 92 is fastened to at least a part of the gear case 3.

The torque sensor 9 has a through-hole 96 extending through the front surface 91A of the front plate 91 and the rear surface 92B of the rear plate 92. The through-hole 96 at least partially extends through the hollow portion 90.

The strain gauges 93 are fixed to the hollow portion 90. The strain gauges 93 output detection signals (voltages) indicating torque applied to the output unit 8. The strain gauges 93 in the embodiment are fixed to the outer surface of the hollow portion 90. The strain gauges 93 (four in the embodiment) are fixed to the hollow portion 90. The four strain gauges 93 are arranged on the hollow portion 90 at circumferentially regular intervals.

The lead wires 94 are connected to the strain gauges 93. The detection signals output from the strain gauges 93 are transmitted to the controller 15 through the lead wires 94.

In a screwing operation, torque applied to the output unit 8 is transmitted to the internal gear 70 through the carrier 72C and the planetary gears 72P. The front plate 91 in the torque sensor 9 is connected to the internal gear 70. The rear plate 92 in the torque sensor 9 is fastened to at least a part of the gear case 3. Thus, torque applied to the internal gear 70 twists the hollow portion 90 in the rotation direction. The four strain gauges 93 on the surface of the hollow portion 90 are thus deformed. The detection signals (voltages) indicating torque applied to the hollow portion 90 are then output from the strain gauges 93. The torque applied to the output unit 8 is thus transmitted to the torque sensor 9 through the planetary gear assembly 7, and thus the torque sensor 9 can detect the torque applied to the output unit 8.

The strain gauges 93 in the embodiment indirectly detect the torque applied to the output unit 8 by detecting the torque applied to the hollow portion 90. As the torque applied to the output unit 8 increases, the detection signals (voltages) output from the strain gauges 93 become higher. As the torque applied to the output unit 8 decreases, the detection signals (voltages) output from the strain gauges 93 become lower.

Structure of Fastening Rear Plate to Gear Case

Figure 10:
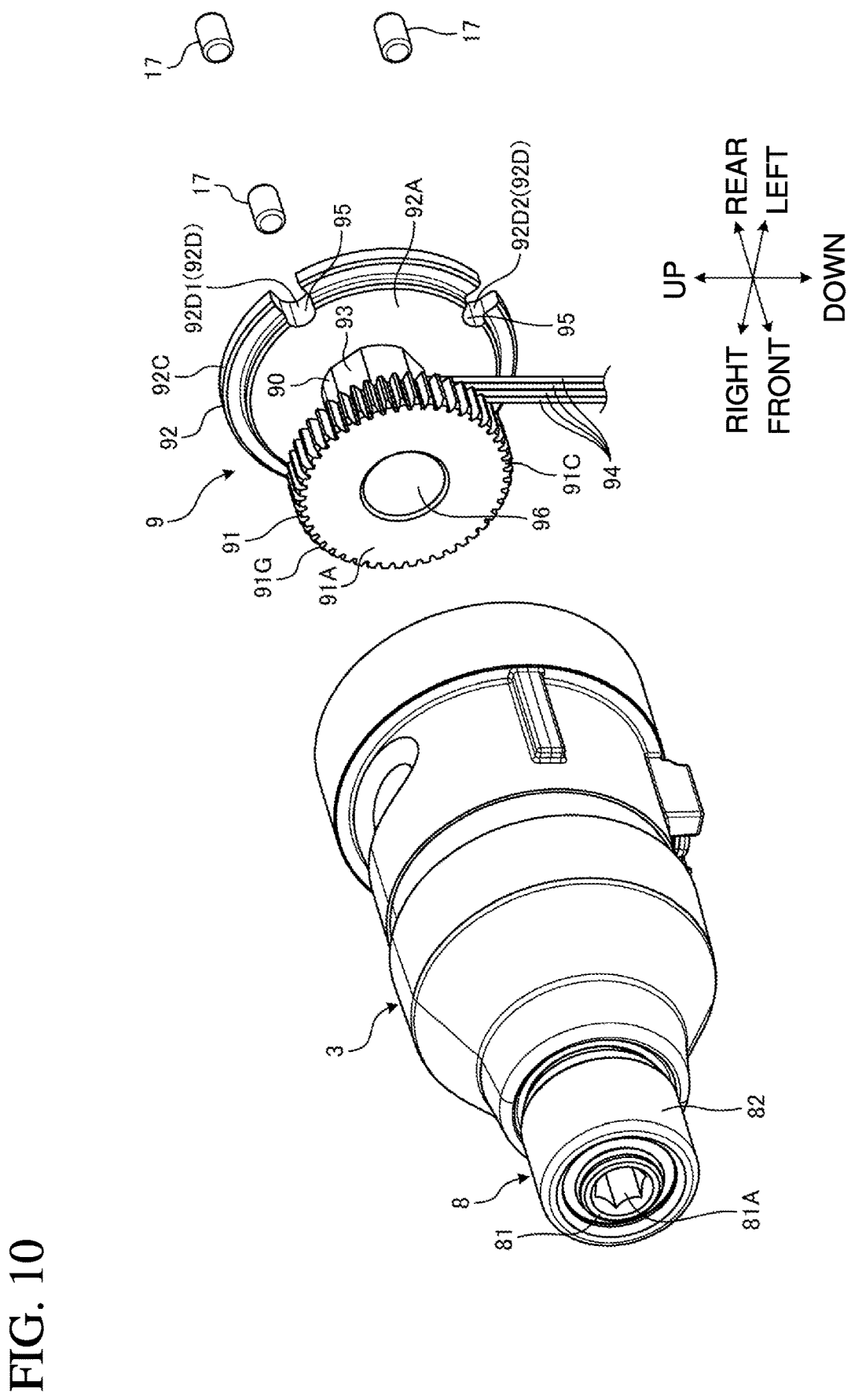
FIG. 10 is a perspective view of a structure of fastening a rear plate to the gear case in the embodiment as viewed from the left front.
Figure 11:
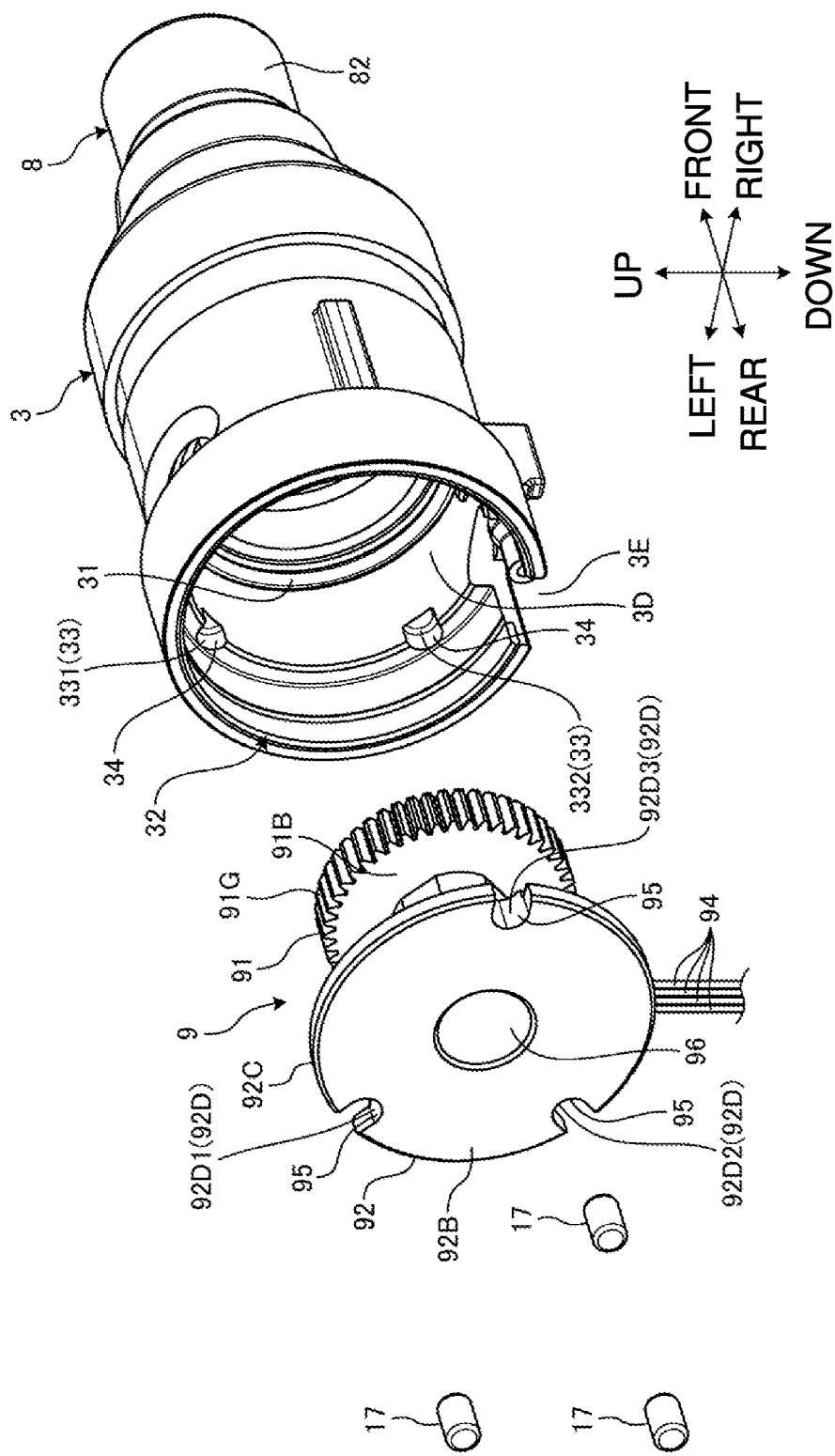
FIG. 11 is a perspective view of the structure of fastening the rear plate to the gear case in the embodiment as viewed from the right rear.
Figure 12:
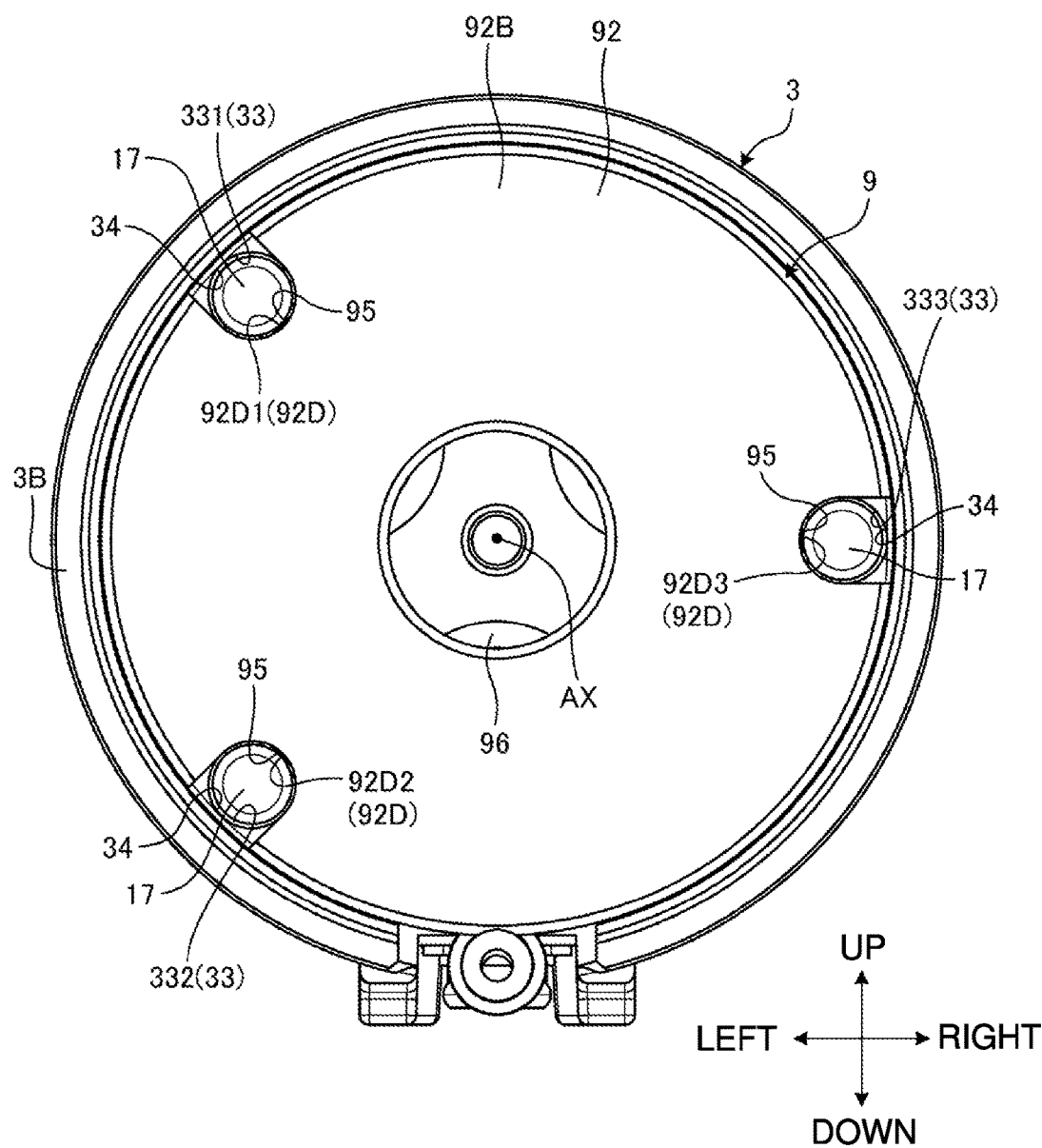
FIG. 12 is a rear view of the torque sensor accommodated in the gear case in the embodiment.

FIG. 10 is a perspective view of a structure of fastening the rear plate 92 to the gear case 3 in the embodiment as viewed from the left front. FIG. 11 is a perspective view of the structure of fastening the rear plate 92 to the gear case 3 in the embodiment as viewed from the right rear. FIG. 12 is a rear view of the torque sensor 9 accommodated in the gear case 3 in the embodiment.

The gear case 3 has an opening 32 at its rear end. The planetary gear assembly 7 is placed in the gear case 3 through the opening 32. The torque sensor 9 is then placed in the gear case 3 through the opening 32. The torque sensor 9 is placed in the gear case 3 with the gear teeth 91G meshing with the internal gear 70 in the gear case 3. The front plate 91 is coupled to the internal gear 70 through meshing between the gear teeth 91G and the internal gear 70.

After the torque sensor 9 is placed in the gear case 3, the rear plate 92 is fastened to the gear case 3. The rear plate 92 and the gear case 3 are fastened together with fasteners 17. The fasteners 17 restrict relative rotation at least between the rear plate 92 and the gear case 3.

The fasteners 17 are arranged radially inward from the outer circumferential surface 92C of the rear plate 92. The fasteners 17 are in contact with first portions 95 of the rear plate 92 and second portions 34 of the gear case 3. The fasteners 17 thus restrict relative rotation between the rear plate 92 and the gear case 3.

The outer circumferential surface 92C has the recesses 92D (first recesses) recessed radially inward from the outer circumferential surface 92C. The recesses (three in the embodiment) 92D are located at intervals in the circumferential direction.

The inner circumferential surface 3D of the gear case 3 has multiple recesses 33 (second recesses). The recesses (three in the embodiment) 33 are located at intervals in the circumferential direction.

The fasteners 17 in the embodiment include pins each received between a corresponding recess 92D and a corresponding recess 33. Three fasteners 17 are used in the embodiment. The first portions 95 of the rear plate 92 in contact with the fasteners 17 each include an inner surface of the corresponding recess 92D. The second portions 34 of the gear case 3 in contact with the fasteners 17 each include an inner surface of the corresponding recess 33. The torque sensor 9 is accommodated in the gear case 3 with the fasteners 17 received between the corresponding recess 92D and the corresponding recess 33. This structure restricts relative rotation between the rear plate 92 and the gear case 3 about the rotation axis AX.

The torque sensor 9 can rotate relative to the gear case 3, with the front plate 91 coupled to the internal gear 70 and the fasteners 17 being not in contact with the first portions 95 of the rear plate 92 and the second portions 34 of the gear case 3. More specifically, the torque sensor 9 can rotate relative to the gear case 3 when placed in the gear case 3 with the gear teeth 91G meshing with the internal gear 70 before the rear plate 92 and the gear case 3 are fastened together with the fasteners 17. As described above, the internal gear 70 is rotatable relative to the gear case 3. Thus, the torque sensor 9 can rotate relative to the gear case 3 together with the internal gear 70 with the front plate 91 and the internal gear 70 being coupled together before the rear plate 92 and the gear case 3 are fastened together with the fasteners 17. The torque sensor 9 is rotated to have the recesses 92D circumferentially aligned with the recesses 33.

After the torque sensor 9 is rotated relative to the gear case 3 to have the recesses 92D circumferentially aligned with the recesses 33, the fasteners 17 are each placed between a corresponding recess 92D and a corresponding recess 33. This structure restricts relative rotation between the rear plate 92 and the gear case 3 about the rotation axis AX.

As shown in FIG. 12, the recesses 92D including the first portions 95 and the recesses 33 including the second portions 34 are arranged at circumferentially irregular intervals. The recesses 92D in the embodiment include a first recess 92D1, a second recess 92D2, and a third recess 92D3. The recesses 33 include a first recess 331, a second recess 332, and a third recess 333.

The distances in the radial direction from the rotation axis AX to the first portions 95 of the recesses 92D1, 92D2, and 92D3 are equal to each other. The distance in the radial direction from the rotation axis AX to the second portions 34 of the recesses 331, 332, and 333 are equal to each other.

In the circumferential direction, the distance between the first portions 95 of the recesses 92D1 and 92D2 is different from the distance between the first portions 95 of the recesses 92D2 and 92D3. In the circumferential direction, the distance between the second portions 34 of the recesses 331 and 332 is different from the distance between the second portions 34 of the recesses 332 and 333.

In the circumferential direction, the distance between the first portions 95 of the recesses 92D2 and 92D3 may be different from or equal to the distance between the first portions 95 of the recesses 92D3 and 92D1. In the circumferential direction, the distance between the second portions 34 of the recesses 332 and 333 may be different from or equal to the distance between the second portions 34 of the recesses 333 and 331.

When the recess 92D1 and the recess 331 are aligned with each other, the recess 92D2 and the recess 332 are aligned with each other, and the recess 92D3 and the recess 333 are aligned with each other. Although the recess 92D1 and the recess 332 are aligned with each other, the recess 92D2 is misaligned with the recess 331 or 333, and the recess 92D3 is misaligned with the recess 333 or 331. Although the recess 92D1 and the recess 333 are aligned with each other, the recess 92D2 is misaligned with the recess 331 or 332, and the recess 92D3 is misaligned with the recess 332 or 331.

When the three recesses 92D and the three recesses 33 are circumferentially aligned with each other, the lead wires 94 can extend downward from the hollow portion 90. The gear case 3 has, in its lower portion, a recess 3E through which the lead wires 94 can extend.

Structure of Fastening Bearing Box to Gear Case

Figure 13:
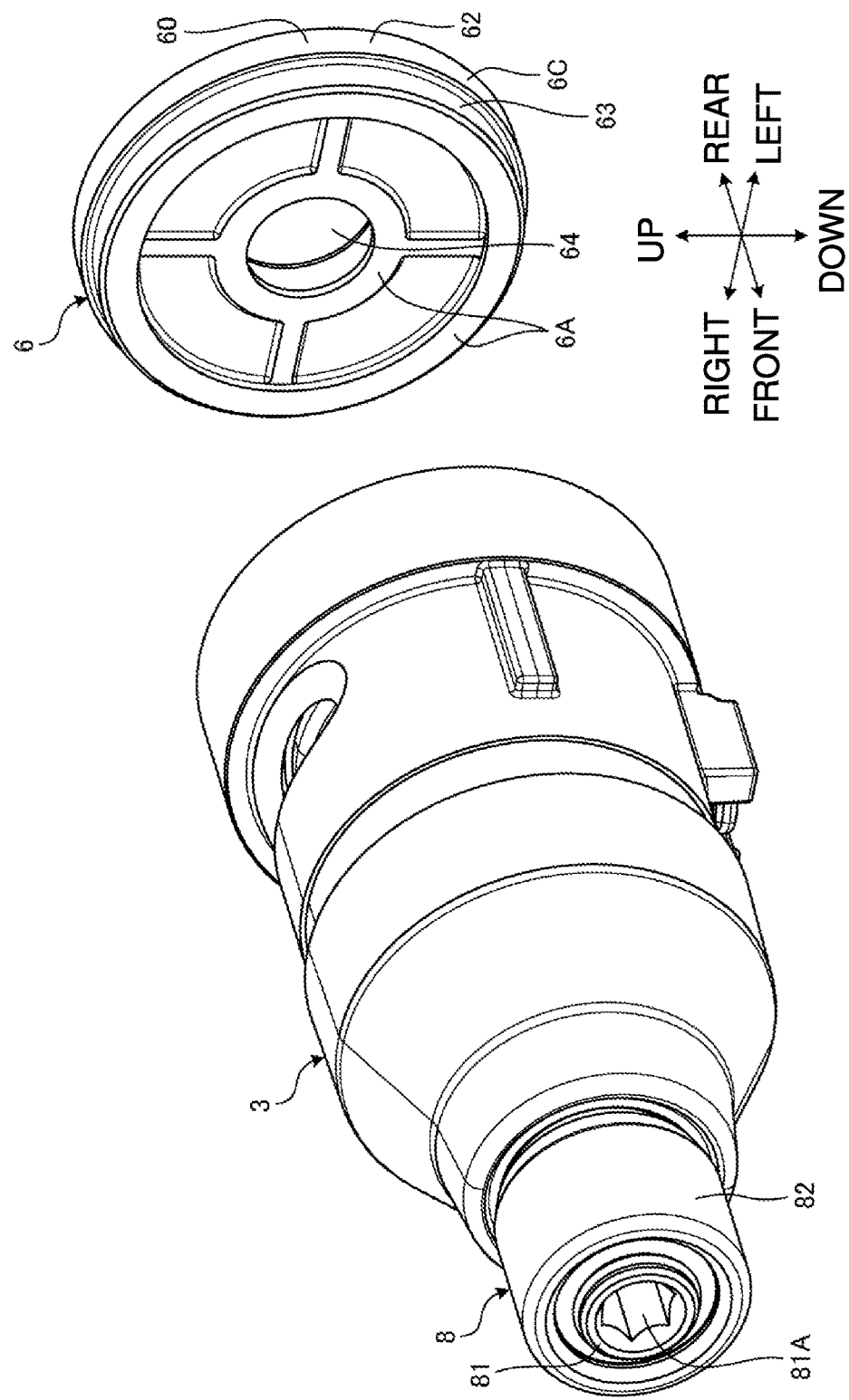
FIG. 13 is a perspective view of a structure of fastening a bearing box to the gear case in the embodiment as viewed from the left front.
Figure 14:
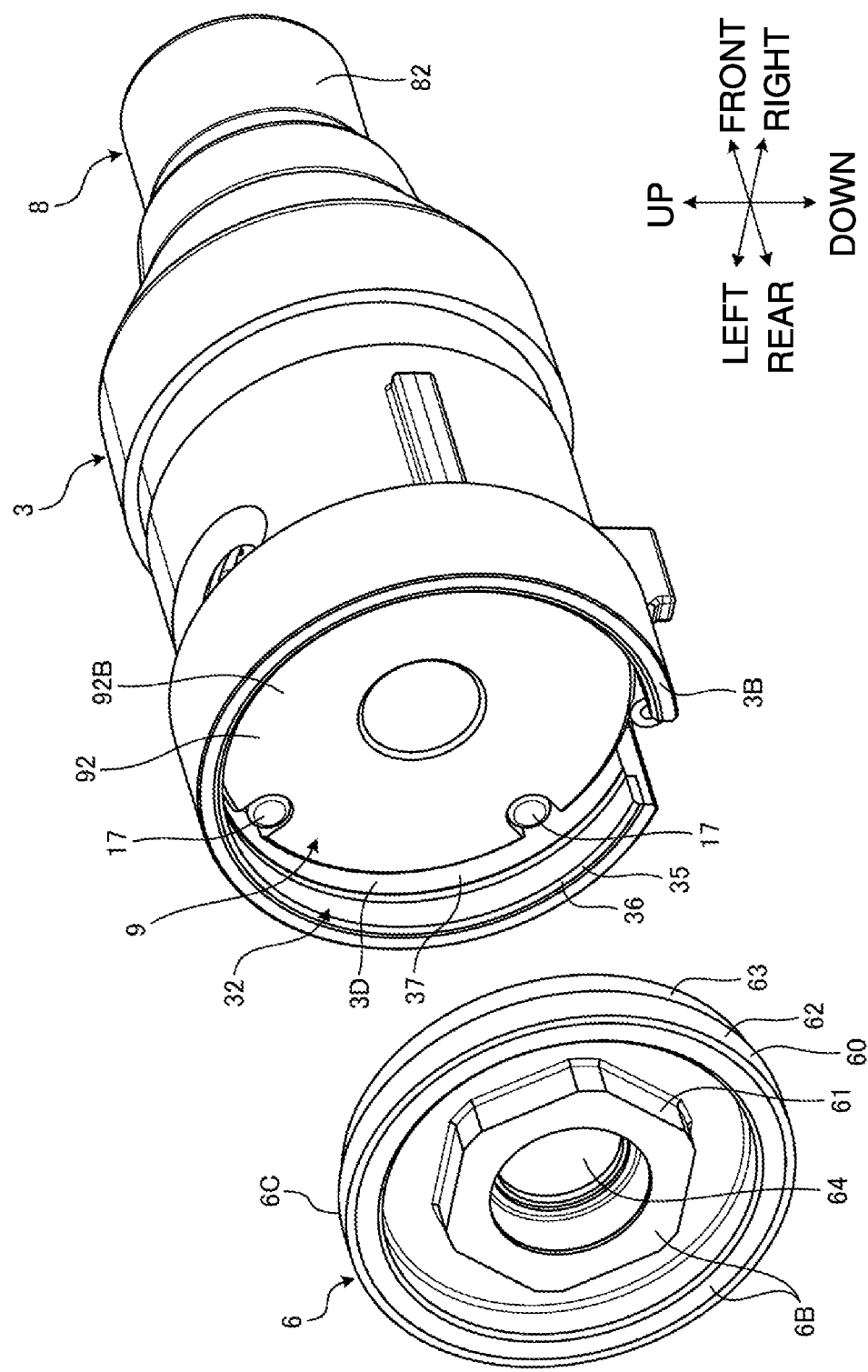
FIG. 14 is a perspective view of the structure of fastening the bearing box to the gear case in the embodiment as viewed from the right rear.

FIG. 13 is a perspective view of a structure of fastening the bearing box 6 to the gear case 3 in the embodiment as viewed from the left front. FIG. 14 is a perspective view of the structure of fastening the bearing box 6 to the gear case 3 in the embodiment as viewed from the right rear.

The bearing box 6 is accommodated in and fastened to the gear case 3. The bearing box 6 is at least partially placed in the gear case 3 through the opening 32 in the gear case 3 at its rear end. After the planetary gear assembly 7 and the torque sensor 9 are placed in the gear case 3, the bearing box 6 is placed in the gear case 3 through the opening 32.

The bearing box 6 is substantially annular. The bearing box 6 has a front surface 6A, a rear surface 6B, and an outer circumferential surface 6C. The front surface 6A faces frontward. The rear surface 6B faces rearward. The bearing box 6 has an opening 64 at the center.

The bearing box 6 at least partially has a thread 60 on the outer circumferential surface 6C. The gear case 3 at least partially has a threaded groove 35 on the inner circumferential surface 3D. The bearing box 6 is fastened to the gear case 3 through engagement between the thread 60 and the threaded groove 35. More specifically, the bearing box 6 is screwed into the gear case 3 to be fastened to the gear case 3. The bearing box 6 has a nut 61 at the rear. The nut 61 surrounds the opening 64 at the rear of the bearing box 6. The nut 61 has a hexagonal profile orthogonal to the rotation axis AX. A nut tightening tool is fitted to the nut 61 to rotate the bearing box 6. The bearing box 6 is thus screwed into the gear case 3.

The bearing box 6 includes a connecting portion 62 and a straight trunk 63. The connecting portion 62 has the thread 60. The straight trunk 63 is located frontward from the connecting portion 62 and the thread 60. The straight trunk 63 has no thread and is cylindrical. The straight trunk 63 has a smaller outer diameter than the connecting portion 62.

The gear case 3 includes a connecting portion 36 and a straight tube 37. The connecting portion 36 has the threaded groove 35. The straight tube 37 is located frontward from the connecting portion 36 and the threaded groove 35. The straight tube 37 has no threaded groove and is cylindrical. The straight tube 37 has a smaller inner diameter than the connecting portion 36.

The straight trunk 63 is received in the straight tube 37 with the thread 60 on the connecting portion 62 engaged with the threaded groove 35 on the connecting portion 36. The outer circumferential surface of the straight trunk 63 is in contact with the inner circumferential surface of the straight tube 37. The bearing box 6 and the gear case 3 are thus positioned relative to each other in the radial direction.

The bearing box 6 is accommodated in the gear case 3 with the front surface 6A of the bearing box 6 in contact with the rear surface 92B of the rear plate 92. The front surface 6A of the bearing box 6 is in contact with the rear surface 92B of the rear plate 92 with the thread 60 on the connecting portion 62 engaged with the threaded groove 35 on the connecting portion 36. The bearing box 6, the gear case 3, and the torque sensor 9 are thus positioned relative to one another in the axial direction.

The bearing box 6 is accommodated in the gear case 3 with the rear surface 6B of the bearing box 6 located frontward from a rear end face 3B of the gear case 3. The rear surface 6B of the bearing box 6 is located frontward from the rear end face 3B of the gear case 3 with the thread 60 on the connecting portion 62 engaged with the threaded groove 35 on the connecting portion 36. In other words, the bearing box 6 is entirely received in the gear case 3.

As shown in FIG. 3, the bearing box 6 and the bearing 54 supported by the bearing box 6 are located between the stator 51 and the rear plate 92 in the front-rear direction. The bearing box 6 and the bearing 54 in the embodiment are located between the fan 10 and the rear plate 92 in the front-rear direction.

Assembly Method

A method for assembling the screwing machine 1 will now be described. A method for assembling components of the screwing machine 1 accommodated in the motor compartment 21 will be described below. An operation of assembling the screwing machine 1 according to the embodiment is performed by an assembler. The operation of assembling the screwing machine 1 may be performed by an assembly robot.

As described with reference to FIGS. 10 and 11, the gear case 3 has the opening 32 at its rear end. The assembler inserts, into the gear case 3 through the opening 32, the output unit 8 and then the planetary gear assembly 7. As described above, the planetary gear assembly 7 includes the planetary gears 71P, the carrier 71C, the sun gear 72S, the planetary gears 72P, the carrier 72C, and the internal gear 70. Each planetary gear 71P meshes with the pinion gear 71S mounted on the front end of the rotor shaft 53. The carrier 71C supports the planetary gears 71P in a rotatable manner. The sun gear 72S is integral with the carrier 71C. Each planetary gear 72P meshes with the sun gear 72S. The carrier 72C supports the planetary gears 72P in a rotatable manner. The internal gear 70 meshes with the planetary gears 72P. The planetary gears 71P are connected to the internal gear 70 via the carrier 71C, the sun gear 72S, and the planetary gears 72P.

The assembler then inserts the torque sensor 9 through the opening 32 into the gear case 3 accommodating the planetary gear assembly 7. As described above, the torque sensor 9 includes the front plate 91, the rear plate 92, the hollow portion 90, the strain gauges 93, and the lead wires 94. The rear plate 92 is located rearward from the front plate 91. The hollow portion 90 is located between the front plate 91 and the rear plate 92 in the front-rear direction. The strain gauges 93 are fixed to the hollow portion 90. The lead wires 94 are connected to the strain gauges 93. The assembler inserts the torque sensor 9 into the gear case 3 to mesh the gear teeth 91G on the front plate 91 in the torque sensor 9 with the internal gear 70 accommodated in the gear case 3. The front plate 91 is coupled to the internal gear 70 through meshing between the gear teeth 91G and the internal gear 70.

After the gear teeth 91G on the front plate 91 mesh with the internal gear 70, the assembler rotates the rear plate 92 relative to the gear case 3 to circumferentially align the rear plate 92 with the gear case 3 about the rotation axis AX. As described above, the internal gear 70 is rotatable relative to the gear case 3. As the rear plate 92 rotates with the gear teeth 91G on the front plate 91 meshing with the internal gear 70, the torque sensor 9 rotates relative to the gear case 3 together with the internal gear 70.

As described above, the rear plate 92 has the recesses 92D (first recesses). The gear case 3 has the recesses 33 (second recesses). Aligning the rear plate 92 with the gear case 3 includes aligning the recesses 92D with the recesses 33. The assembler rotates the rear plate 92 to circumferentially align the recesses 92D with the recesses 33 with the gear teeth 91G on the front plate 91 meshing with the internal gear 70. The torque sensor 9 and the internal gear 70 thus rotate relative to the gear case 3.

As described above with reference to FIG. 12, the recesses 92D and the recesses 33 are arranged at circumferentially irregular intervals. The assembler rotates the rear plate 92 to align the recess 92D1 with the recess 331, the recess 92D2 with the recess 332, and the recess 92D3 with the recess 333.

The lead wires 94 may extend downward from the hollow portion 90. The lead wires 94 extend downward from the hollow portion 90 when the three recesses 92D are aligned with the three recesses 33. In the embodiment, the three recesses 92D and the three recesses 33 are arranged at circumferentially irregular intervals. The assembler thus aligns the three recesses 92D with the three recesses 33 to allow the lead wires 94 to extend downward from the hollow portion 90.

In the structure with the three recesses 92D and the three recesses 33 arranged at circumferentially regular intervals, the recess 92D1 is aligned with the recess 331, and the recess 92D2 is aligned with the recess 332 and the recess 92D3 with the recess 333. When the recess 92D1 is aligned with the recess 332, the recess 92D2 is aligned with the recess 333, and the recess 92D3 is aligned with the recess 331. When the recess 92D1 is aligned with the recess 333, the recess 92D2 is aligned with the recess 331, and the recess 92D3 is aligned with the recess 332.

As described above, when the three recesses 92D and the three recesses 33 are arranged at circumferentially regular intervals, the three recesses 92D are aligned with the three recesses 33 in three different manners. When the three recesses 92D are aligned with the three recesses 33 in multiple different manners, the lead wires 94 may fail to extend downward from the hollow portion 90 although the three recesses 92D are aligned with the three recesses 33.

In the embodiment, the recesses 92D and the recesses 33 are arranged at circumferentially irregular intervals. Thus, when the three recesses 92D are circumferentially aligned with the three recesses 33, the lead wires 94 extend downward from the hollow portion 90. This structure prevents erroneous mounting performed by the assembler.

After the recesses 92D are aligned with the recesses 33, the assembler fastens the rear plate 92 to the gear case 3. Fastening the rear plate 92 to the gear case 3 includes placing the fasteners 17 between the respective recesses 92D and the recesses 33 aligned with each other. The assembler inserts each fastener 17 into between a corresponding recess 92D and a corresponding recess 33 from behind the rear plate 92. Placing the fasteners 17 in the respective recesses 92D and the recesses 33 restricts relative rotation between the rear plate 92 and the gear case 3 about the rotation axis AX.

After fastening the rear plate 92 to the gear case 3 with the fasteners 17, the assembler inserts the bearing box 6 into the gear case 3.

As described with reference to FIGS. 13 and 14, the outer circumferential surface 6C of the bearing box 6 at least partially has the thread 60. The inner circumferential surface 3D of the gear case 3 at least partially has the threaded groove 35. The assembler fits the nut tightening tool to the nut 61 in the bearing box 6 and rotates the bearing box 6. This screws the bearing box 6 into the gear case 3, fastening the bearing box 6 to the gear case 3.

The bearing box 6 is accommodated in the gear case 3 with the front surface 6A of the bearing box 6 in contact with the rear surface 92B of the rear plate 92. The bearing box 6 is accommodated in the gear case 3 with the rear surface 6B of the bearing box 6 located frontward from the rear end face 3B of the gear case 3.

After the bearing box 6 is received in and fastened to the gear case 3, the assembler inserts the rotor shaft 53 into the hollow portion 90 of the torque sensor 9 to allow the pinion gear 71S on the front end of the rotor shaft 53 to mesh with the planetary gears 71P in the planetary gear assembly 7.

Figure 15:
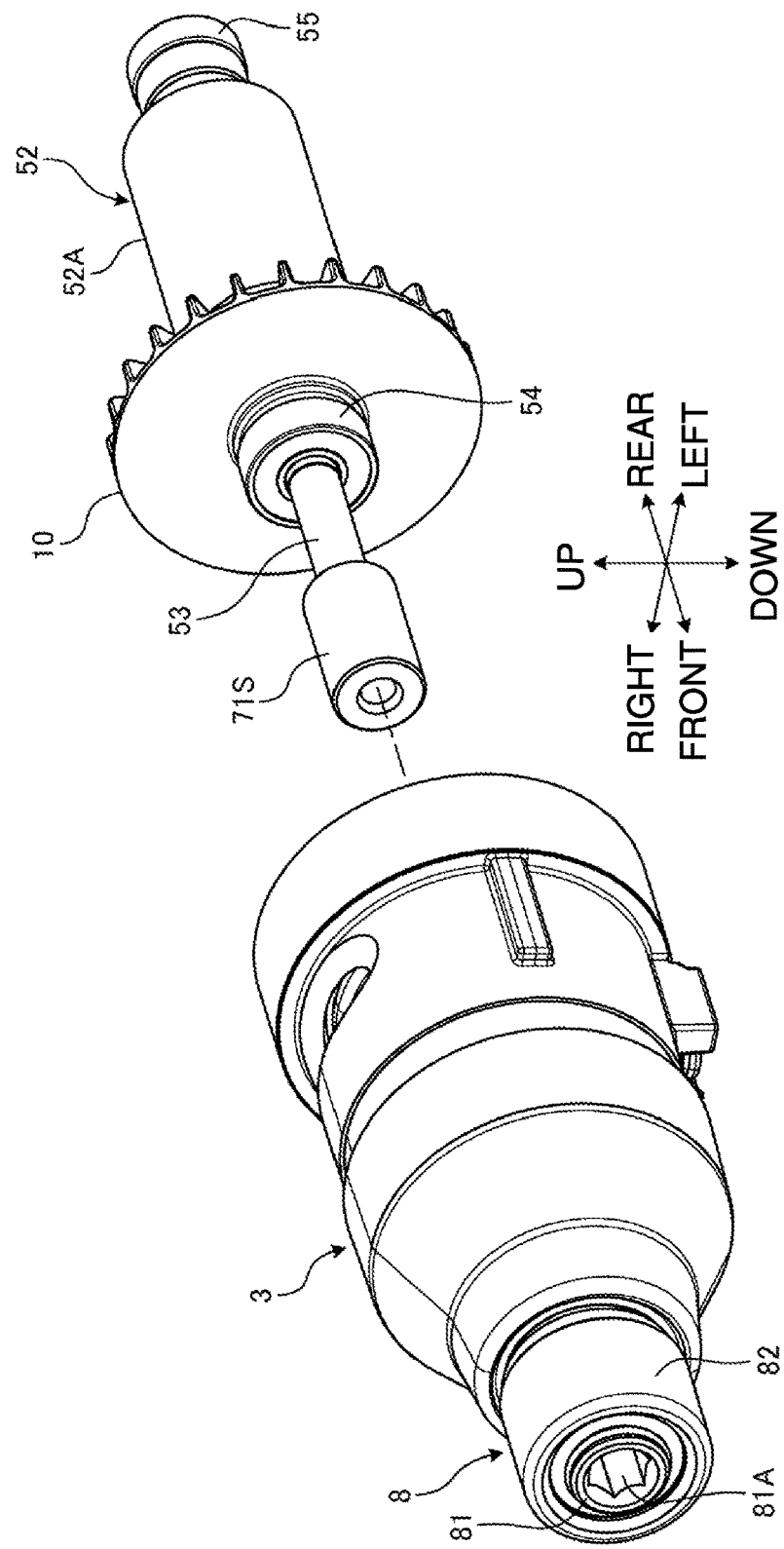
FIG. 15 is a perspective view of the gear case and a rotor shaft in the embodiment as viewed from the left front, describing an insertion method.
Figure 16:
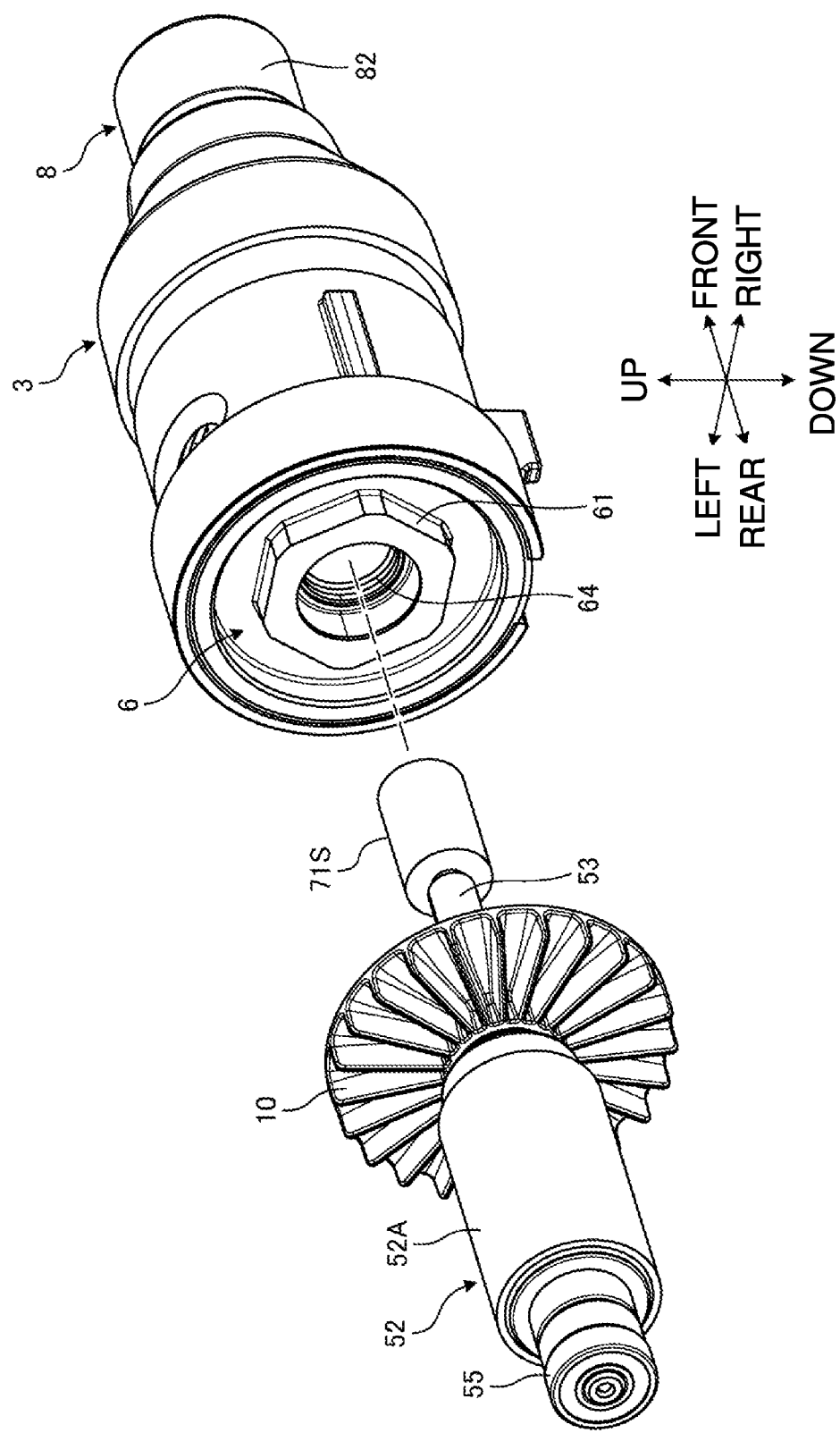
FIG. 16 is a perspective view of the gear case and the rotor shaft in the embodiment as viewed from the right rear, describing the insertion method.

FIG. 15 is a perspective view of the gear case 3 and the rotor shaft 53 in the embodiment as viewed from the left front, describing an insertion method. FIG. 16 is a perspective view of the gear case 3 and the rotor shaft 53 in the embodiment as viewed from the right rear, describing the insertion method.

As shown in FIGS. 15 and 16, the bearing box 6 is fastened to the gear case 3. The pinion gear 71S is mounted on the front end of the rotor shaft 53. The bearing 54 surrounds the rotor shaft 53.

The bearing 54 in the embodiment has an inner diameter smaller than the outer diameter of the pinion gear 71S.

The assembler inserts the pinion gear 71S into the gear case 3 through the opening 64 in the bearing box 6. In the gear case 3, the torque sensor 9 is located frontward from the bearing box 6, and the planetary gear assembly 7 is located frontward from the torque sensor 9. The pinion gear 71S inserted into the gear case 3 passes through the through-hole 96 in the torque sensor 9 and reaches the planetary gears 71P in the planetary gear assembly 7. The assembler can insert the rotor shaft 53 into the gear case 3 to allow the pinion gear 71S to mesh with the planetary gears 71P in the planetary gear assembly 7.

The bearing 54 is thus received in the opening 64 in the bearing box 6. The bearing 54 is supported by the bearing box 6.

In a screwing operation, the controller 15 activates the motor 5 to rotate the output unit 8 in response to operation signals from the trigger switch 11. When a screw is tightened into a workpiece in the screwing operation, the output unit 8 receives more torque. The torque applied to the output unit 8 is transmitted to the internal gear 70 through the carrier 72C and the planetary gears 72P. The torque applied to the internal gear 70 is transmitted to the torque sensor 9 through the front plate 91. The torque sensor 9 detects torque applied to the output unit 8.

The rear plate 92 in the torque sensor 9 is fastened to the gear case 3. The hollow portion 90 of the torque sensor 9 is twisted by the internal gear 70 in the rotation direction. The front plate 91 and the rear plate 92 also receive torque. However, the front plate 91 and the rear plate 92 have larger diameters than the hollow portion 90, and thus undergo less torsional deformation than the hollow portion 90. When the hollow portion 90 of the torque sensor 9 is twisted in the rotation direction, the four strain gauges 93 on the surface of the hollow portion 90 are deformed. Thus, detection signals (voltages) indicating torque applied to the hollow portion 90 are transmitted to the controller 15 from the strain gauges 93 through the lead wires 94.

The controller 15 receives detection signals from the torque sensor 9. The controller 15 calculates torque applied to the output unit 8 based on the detection signals from the torque sensor 9. The controller 15 stores a target torque. The controller 15 controls the motor 5 to tighten the screw into the workpiece with the target torque in response to the detection signals from the torque sensor 9.

When determining that the torque applied to the output unit 8 reaches the target torque in response to the detection signals from the torque sensor 9, the controller 15 controls the motor 5 to stop rotation of the rotor 52. The controller 15 can thus control the motor 5 to tighten the screw into the workpiece with the target torque in response to the detection signals from the torque sensor 9.

The screwing machine 1 according to the embodiment includes a radio communication device (not shown). The radio communication device is located in a predetermined portion of the housing 2. The radio communication device can perform near-field communications with a communication scheme available without a radio license. The radio communication device can perform radio communications with a communication scheme in accordance with, for example, the standards of IEEE802.15.1 by Institute of Electrical and Electronics Engineers (IEEE).

The controller 15 transmits detection signals from the torque sensor 9 to the radio communication device. The radio communication device transmits the detection signals from the torque sensor 9 to a management computer external to the screwing machine 1. The management computer records the detection signals from the torque sensor 9 in the screwing operation.

The screwing machine 1 according to the embodiment includes the gear case 3 that accommodates the planetary gear assembly 7 and the torque sensor 9, and the bearing box 6 that supports the bearing 54. The bearing 54 supports at least a part of the rotor 52. The gear case 3 and the bearing box 6 are separate members. This structure reduces rotational vibrations from the rotor 52 being transmitted to the torque sensor 9. Reduced vibrations as disturbance being transmitted to the torque sensor 9 reduce deterioration of the detection accuracy of the torque sensor 9.

The gear case 3 has the opening 32 at its rear end. The bearing box 6 is at least partially placed in the gear case 3 through the opening 32. The bearing box 6 at least partially placed in the gear case 3 reduces the likelihood that the size of the screwing machine 1 increases in the axial direction.

The rear surface 6B of the bearing box 6 is located frontward from the rear end face 3B of the gear case 3. The bearing box 6 entirely accommodated in the gear case 3 reduces the likelihood that the size of the screwing machine 1 increases in the axial direction.

The bearing box 6 is fastened to the gear case 3. This structure restricts a change of the relative positions between the bearing box 6 and the gear case 3.

The bearing box 6 at least partially has the thread 60 on the outer circumferential surface 6C. The gear case 3 at least partially has the threaded groove 35 on the inner circumferential surface 3D. The bearing box 6 is easily fastened to the gear case 3 through engagement between the thread 60 and the threaded groove 35.

The bearing box 6 includes the straight trunk 63 located frontward from the thread 60. The gear case 3 includes the straight tube 37 located frontward from the threaded groove 35. The outer circumferential surface of the straight trunk 63 is in contact with the inner circumferential surface of the straight tube 37 with the thread 60 engaged with the threaded groove 35. The bearing box 6 and the gear case 3 are thus positioned relative to each other in at least the radial direction.

The front surface 6A of the bearing box 6 is in contact with the rear surface 92B of the rear plate 92. The bearing box 6, the gear case 3, and the torque sensor 9 are thus positioned relative to one another in at least the axial direction.

The gear case 3 has the groove 31 on the inner circumferential surface 3D. The elastic member 74 (first elastic member) is received in the groove 31. The rear end face 70B of the internal gear 70 is in contact with the elastic member 74. The internal gear 70 and the gear case 3 are thus positioned relative to each other at least in the axial direction. This structure reduces vibrations of the internal gear 70 being transmitted to the gear case 3.

The pinion gear 71S is detachable from the rotor shaft 53. The pinion gear 71S and the planetary gear assembly 7 are replaceable. This enables any gear ratio between the rotor shaft 53 and the output unit 8 as intended.

The bearing 54 has an inner diameter smaller than the outer diameter of the pinion gear 71S. In other words, the rotor shaft 53 has a smaller outer diameter than the pinion gear 71S. The thin rotor shaft 53 has a low inertia in the rotation direction. In the screwing operation, the controller 15 controls the motor 5 to stop rotation of the rotor 52. The rotor shaft 53 with a low inertia in the rotation direction allows the rotor 52 to stop rotating immediately after the controller 15 starts controlling to stop rotation of the rotor 52. The screw is thus tightened into the workpiece with the target torque.

The elastic members 75 (second elastic members) are located between the gear case 3 and the internal gear 70. This structure reduces vibrations of the internal gear 70 being transmitted to the gear case 3 and also reduces unusual sounds.

The torque sensor 9 includes the gear teeth 91G on the front plate 91. The gear teeth 91G on the front plate 91 mesh with the internal gear 70. Torque applied to the output unit 8 in the screwing operation is transmitted to the internal gear 70 through the carrier 72C and the planetary gears 72P. The torque sensor 9 is connected to the internal gear 70 via the gear teeth 91G. Torque applied to the internal gear 70 is thus transmitted to the torque sensor 9.

The rear plate 92 in the torque sensor 9 is fastened to the gear case 3 with the fasteners 17. The fasteners 17 are in contact with the first portions 95 of the rear plate 92 and the second portions 34 of the gear case 3 to fasten the rear plate 92 in the torque sensor 9 to the gear case 3. The torque sensor 9 is thus appropriately twisted with torque applied to the output unit 8, causing less detection accuracy deterioration. The fasteners 17 are located radially inward from the outer circumferential surface 92C of the rear plate 92. This structure reduces the likelihood that the size of the gear case 3 increases in the radial direction.

The rear plate 92 has the recesses 92D (first recesses) on the outer circumferential surface 92C. The gear case 3 has the recesses 33 (second recesses) on the inner circumferential surface 3D. The fasteners 17 include pins each received between a corresponding recess 92D and a corresponding recess 33. The first portions 95 each include the inner surface of the corresponding recess 92D. The second portions 34 each include the inner surfaces of the corresponding recess 33. The rear plate 92 in the torque sensor 9 is thus easily fastened to the gear case 3 by simply inserting the fasteners 17 into between the respective recesses 92D and the recesses 33 from behind the rear plate 92.

The rear plate 92 includes the first portions 95 arranged at circumferentially irregular intervals about the rotation axis AX. The gear case 3 includes the second portions 34 arranged at circumferentially irregular intervals about the rotation axis AX. The assembler can fasten the torque sensor 9 to the gear case 3 by aligning the recesses 92D with the recesses 33 to allow the lead wires 94 to extend downward from the hollow portion 90. This structure reduces human errors by the assembler, and erroneous mounting of the torque sensor 9 on the gear case 3.

After the gear teeth 91G on the front plate 91 are coupled to the internal gear 70 and before the rear plate 92 is fastened to the gear case 3 with the fasteners 17, the torque sensor 9 can rotate relative to the gear case 3. The assembler can rotate the torque sensor 9 and the internal gear 70 together relative to the gear case 3 by rotating the rear plate 92 to align the recesses 92D with the recesses 33.

To assemble the screwing machine 1, the torque sensor 9 is inserted into the gear case 3 that accommodates the planetary gears 71P and the internal gear 70 connected to the planetary gears 71P. The gear teeth 91G on the front plate 91 mesh with the internal gear 70. The rear plate 92 is then aligned with the gear case 3 by circumferentially rotating the rear plate 92 relative to the gear case 3. The rear plate 92 is then fastened to the gear case 3. The screwing machine 1 is thus assembled with high workability.

The rear plate 92 has the recesses 92D (first recesses). The gear case 3 has the recesses 33 (second recesses). Circumferentially aligning the rear plate 92 with the gear case 3 includes aligning the recesses 92D with the recesses 33. Fastening the rear plate 92 to the gear case 3 includes placing the fasteners 17 between the respective recesses 92D and the recesses 33 circumferentially aligned with one another. The screwing machine 1 is thus assembled with high workability.

After the rear plate 92 is fastened to the gear case 3, the bearing box 6 is inserted into the gear case 3. The rotor shaft 53 is then inserted into the hollow portion 90 to allow the pinion gear 71S on the front end of the rotor shaft 53 to mesh with the planetary gears 71P. The bearing 54 that supports the rotor shaft 53 in the motor 5 is inserted into the opening 64 in the bearing box 6. The screwing machine 1 is thus assembled with high workability.

OTHER EMBODIMENTS

In the above embodiment, the planetary gears 71P that mesh with the pinion gear 71S are connected to the internal gear 70 via the carrier 71C, the sun gear 72S, and the planetary gears 72P. The planetary gears 71P may mesh with the internal gear 70. The carrier 71C may be connected to the output unit 8. More specifically, the sun gear 72S and the planetary gears 72P may be eliminated.

In the above embodiment, the battery pack 16 attached to the battery mount 4 is used as a power supply of the screwing machine 1. In some embodiments, the screwing machine 1 may use utility power (alternating-current power supply).

In the above embodiment, the screwing machine 1 being an electric driver is described as an example of a power tool. The power tool may be any tool including the motor 5 and the output unit 8 rotated by power generated by the motor 5. The power tool may be at least one of a vibration driver drill, a grinder, an angle drill, an impact driver, a hammer drill, a circular saw, and a reciprocating saw.

In the above embodiment, the power tool includes the motor 5 being an electric motor as a power source. The power tool may be a pneumatic tool including a pneumatic motor as a power source. In some embodiments, the power tool may include any power source other than an electric motor or a pneumatic motor. The power tool may include, for example, a hydraulic motor or an engine-driven motor as a power source.

REFERENCE SIGNS LIST 1 screwing machine
2 housing
2B screw boss
2L left housing
2R right housing
2S screw
3 gear case
3B rear end face
3D inner circumferential surface
3E recess
3R recess
3T protrusion
4 battery mount
5 motor
6 bearing box
6A front surface
6B rear surface
6C outer circumferential surface
7 planetary gear assembly 8 output unit
9 torque sensor
10 fan
11 trigger switch
11A trigger
11B switch body
12 forward-reverse switch lever
13 sound output unit
14 light emitter
15 controller
15A board
15B controller case
16 battery pack
17 fastener
21 motor compartment
22 grip
23 controller compartment
24 opening
24A inlet
24B outlet
31 groove
32 opening
33 recess
34 second portion
35 threaded groove
36 connecting portion
37 straight tube
51 stator
51A stator core
51B front insulator
51C rear insulator
51D coil
51E sensor board
51F short-circuiting member
51G fuse terminal
52 rotor
52A rotor core
52B permanent magnet
53 rotor shaft
54 bearing
55 bearing
57 bearing holder
60 thread
61 nut
62 connecting portion
63 straight trunk
64 opening
70 internal gear
70B rear end face
70C outer circumferential surface
71C carrier
71P planetary gear
71S pinion gear
72C carrier
72P planetary gear
72S sun gear
73 washer
74 elastic member (first elastic member)
75 elastic member (second elastic member)
76 groove
81 spindle
81A insertion hole
82 chuck
82A ball
83 bearing
84 bearing
90 hollow portion
91 front plate
91A front surface
91B rear surface
91C outer circumferential surface
91G gear tooth
92 rear plate
92A front surface
92B rear surface
92C outer circumferential surface
92D recess (first recess)
92D1 recess
92D2 recess
92D3 recess
93 strain gauge
94 lead wire
95 first portion
96 through-hole
331 recess
332 recess
333 recess
AX rotation axis

What is claimed is:

1. A screwing machine, comprising:
a motor including a stator and a rotor, the rotor being rotatable about a rotation axis extending in a front-rear direction;
a gear case located frontward from the stator;
a planetary gear accommodated in the gear case and rotatable by the rotor;
an internal gear accommodated in the gear case, connected to the planetary gear, and rotatable relative to the gear case;
a torque sensor accommodated in the gear case, the torque sensor including
a front plate coupled to the internal gear,
a rear plate located rearward from the front plate and supported by the gear case,
a hollow portion located between the front plate and the rear plate in the front-rear direction, and
a strain gauge fixed to the hollow portion;
a bearing located between the stator and the rear plate in the front-rear direction, and supporting at least a part of the rotor; and
a bearing box surrounding the bearing and supporting the bearing.

2. The screwing machine according to claim 1, wherein the gear case has an opening at a rear end of the gear case, and
the bearing box is at least partially placed in the gear case through the opening.

3. The screwing machine according to claim 2, wherein the bearing box has a rear surface located frontward from a rear end face of the gear case.

4. The screwing machine according to claim 2, wherein the bearing box is fastened to the gear case.

5. The screwing machine according to claim 4, wherein the bearing box includes a thread on at least a part of an outer circumferential surface of the bearing box,
the gear case includes a threaded groove on at least a part of an inner circumferential surface, and
the thread is engaged with the threaded groove to fasten the bearing box to the gear case.

6. The screwing machine according to claim 5, wherein the bearing box includes a straight trunk located frontward from the thread,
the gear case includes a straight tube located frontward from the threaded groove, and an outer circumferential surface of the straight trunk is in contact with an inner circumferential surface of the straight tube with the thread engaged with the threaded groove.

7. The screwing machine according to claim 2, wherein the bearing box has a front surface in contact with a rear surface of the rear plate.

8. The screwing machine according to claim 1, wherein the gear case has a groove on an inner circumferential surface of the gear case, and
the screwing machine further comprises a first elastic member received in the groove and in contact with a rear end face of the internal gear.

9. The screwing machine according to claim 1, wherein the rotor includes
a rotor shaft,
a rotor core surrounding the rotor shaft, and
a permanent magnet held by the rotor core,
the bearing supports a portion of the rotor shaft frontward from the stator, and
the screwing machine further comprises a pinion gear mounted on a front end of the rotor shaft, connected to the planetary gear, and detachable from the rotor shaft.

10. The screwing machine according to claim 9, wherein the bearing has an inner diameter smaller than an outer diameter of the pinion gear.

11. The screwing machine according to claim 1, wherein the gear case has an inner circumferential surface facing an outer circumferential surface of the internal gear, and
the screwing machine further comprises a second elastic member located between the gear case and the internal gear.

12. The screwing machine according to claim 1, wherein the front plate includes gear teeth meshing with the internal gear.

13. The screwing machine according to claim 1, further comprising:
a fastener configured to restrict relative rotation between the rear plate and the gear case, the fastener being located inward from an outer circumferential surface of the rear plate in a radial direction of the rotation axis, the fastener being in contact with a first portion of the rear plate and a second portion of the gear case.

14. The screwing machine according to claim 13, wherein the rear plate has a first recess on the outer circumferential surface of the rear plate,
the gear case has a second recess on an inner circumferential surface of the gear case,
the fastener includes a pin received between the first recess and the second recess,
the first portion includes an inner surface of the first recess, and
the second portion includes an inner surface of the second recess.

15. The screwing machine according to claim 13, wherein the rear plate includes a plurality of the first portions arranged at circumferentially irregular intervals about the rotation axis, and
the gear case includes a plurality of the second portions arranged at circumferentially irregular intervals about the rotation axis.

16. The screwing machine according to claim 13, wherein the torque sensor rotates relative to the gear case, with the front plate being coupled to the internal gear and the fastener being not in contact with the first portion and the second portion.

17. A screwing machine, comprising:
a motor including a stator and a rotor, the rotor being rotatable about a rotation axis extending in a front-rear direction;
a gear case located frontward from the stator;
a planetary gear accommodated in the gear case and rotatable by the rotor;
an internal gear accommodated in the gear case, connected to the planetary gear, and rotatable relative to the gear case;
a torque sensor accommodated in the gear case, the torque sensor including
a front plate coupled to the internal gear,
a rear plate located rearward from the front plate and supported by the gear case,
a hollow portion located between the front plate and the rear plate in the front-rear direction, and
a strain gauge fixed to the hollow portion; and
a fastener configured to restrict relative rotation between the rear plate and the gear case, the fastener being located inward from an outer circumferential surface of the rear plate in a radial direction of the rotation axis, the fastener being in contact with a first portion of the rear plate and a second portion of the gear case.

18. A method for assembling a screwing machine, the method comprising:
inserting a torque sensor into a gear case accommodating a planetary gear and an internal gear connected to the planetary gear, the torque sensor including a front plate including gear teeth, a rear plate located rearward from the front plate, a hollow portion located between the front plate and the rear plate in a front-rear direction, and a strain gauge fixed to the hollow portion;
meshing the internal gear with the gear teeth;
circumferentially aligning, after meshing the internal gear with the gear teeth, the rear plate with the gear case by rotating the rear plate relative to the gear case; and
fastening, after aligning the rear plate with the gear case, the rear plate to the gear case.

19. The method according to claim 18, wherein
the aligning the rear plate with the gear case includes aligning a first recess on the rear plate with a second recess on the gear case, and
the fastening the rear plate to the gear case includes placing a fastener between the first recess and the second recess aligned with each other.

20. The method according to claim 19, further comprising:
inserting a bearing box into the gear case after the rear plate is fastened to the gear case;
inserting, after inserting the bearing box into the gear case, a rotor shaft in a motor into the hollow portion to allow a pinion gear on a front end of the rotor shaft to mesh with the planetary gear; and
inserting a bearing supporting the rotor shaft into the bearing box.

* * * * *